US012791918B2

(12) United States Patent
Lee et al.

(10) Patent No.: US 12,791,918 B2
(45) Date of Patent: Nov. 10, 2026

(54) REFLECTIVE MODULE AND CAMERA MODULE INCLUDING THE SAME

(71) Applicant: SAMSUNG ELECTRO-MECHANICS CO., LTD., Suwon-si (KR)

(72) Inventors: Hong Joo Lee, Suwon-si (KR); Jae Ho Baik, Suwon-si (KR); Sung Hoon Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 142 days.

(21) Appl. No.: 18/402,200

(22) Filed: Jan. 2, 2024

(65) Prior Publication Data

US 2024/0231194 A1 Jul. 11, 2024

(30) Foreign Application Priority Data

Jan. 11, 2023 (KR) ........................ 10-2023-0004086
Jun. 20, 2023 (KR) ........................ 10-2023-0079159

(51) Int. Cl.

| | |
|---|---|
| ***G03B 17/12*** | (2021.01) |
| ***G01B 7/00*** | (2006.01) |
| ***G03B 5/06*** | (2021.01) |
| ***G03B 17/17*** | (2021.01) |
| ***G03B 30/00*** | (2021.01) |

(52) U.S. Cl.

CPC ............. *G03B 17/12* (2013.01); *G01B 7/003* (2013.01); *G03B 5/06* (2013.01); *G03B 17/17* (2013.01); *G03B 30/00* (2021.01); *G03B 2205/0023* (2013.01); *G03B 2205/0069* (2013.01)

(58) Field of Classification Search

CPC .... G03B 2205/0023; G03B 2205/0069; G03B 17/17

See application file for complete search history.

(56) References Cited

U.S. PATENT DOCUMENTS

2018/0217475 A1* 8/2018 Goldenberg ............. G03B 3/10
2019/0049687 A1* 2/2019 Bachar ............... H02K 41/0354
2021/0294184 A1 9/2021 Kim et al.
2022/0103725 A1* 3/2022 Lee ........................ H04N 23/51
(Continued)

FOREIGN PATENT DOCUMENTS

KR 10-2021-0080294 A 6/2021
KR 10-2021-0117124 A 9/2021
(Continued)

OTHER PUBLICATIONS

Korean Office Action issued on Jan. 16, 2025, in corresponding Korean Patent Application No. 10-2023-0079159. (7pages in English, 6pages in Korean).

*Primary Examiner* — Noam Reisner
(74) *Attorney, Agent, or Firm* — NSIP Law

(57) ABSTRACT

A reflective module includes a reflective member configured to change a path of light, a holder on which a reflective member is mounted, a housing accommodating the holder, a first driver including one first magnet mounted on the holder, a first coil opposing the one first magnet, and a first position sensor, and a second driver including one second magnet mounted on the holder, a second coil opposing the one second magnet, and a second position sensor, wherein one sidewall of the holder and the other sidewall of the holder have different shapes.

19 Claims, 12 Drawing Sheets

(56) References Cited

U.S. PATENT DOCUMENTS

| | | | | |
|---|---|---|---|---|
| 2022/0150389 | A1* | 5/2022 | Smirnov | G03B 5/00 |
| 2022/0252895 | A1 | 8/2022 | Kwon | |
| 2022/0397805 | A1 | 12/2022 | Lee et al. | |

FOREIGN PATENT DOCUMENTS

| | | | |
|---|---|---|---|
| KR | 10-2022-0043879 | A | 4/2022 |
| KR | 10-2022-0151403 | A | 11/2022 |
| KR | 10-2022-0166991 | A | 12/2022 |

* cited by examiner

REFLECTIVE MODULE AND CAMERA MODULE INCLUDING THE SAME

CROSS-REFERENCE TO RELATED APPLICATIONS

This application claims the benefit under 35 USC 119(a) of Korean Patent Application Nos. 10-2023-0004086 filed on Jan. 11, 2023, and 10-2023-0079159 filed on Jun. 20, 2023, in the Korean Intellectual Property Office, the entire disclosures of which are incorporated herein by reference for all purposes.

BACKGROUND

1. Field

The present disclosure relates to a reflective module and a camera module including the same.

2. Description of the Background

A camera module may be basically employed in portable electronic devices, including smartphones. A thickness of portable electronic devices may tend to decrease according to market demand, and accordingly, miniaturization of a camera module may be necessary.

Apart from the demand for miniaturization of a camera module, improvement of performance of a camera module may be necessary, and accordingly, functions such as an autofocusing function and an optical image stabilization function may be added to a camera module, such that there may be a limitation in reducing a size of a camera module.

That is, despite the demand for miniaturization, it may be difficult to reduce a size of a camera module, and accordingly, there is a limitation in reducing a thickness of a portable electronic device.

Recently, to address the above issues, a camera module including a plurality of lenses disposed in a length direction or in a width direction rather than a thickness direction of a portable electronic device and a reflective member for changing a path of light has been suggested.

Since such a camera module may have a structure in which shaking may be corrected by rotating a reflective member, it may be necessary to accurately sense a position of the reflective member to improve shake optical image stabilization performance.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a reflective module includes a reflective member configured to change a path of light, a holder on which a reflective member is mounted, a housing accommodating the holder, a first driver including one first magnet mounted on the holder, a first coil opposing the one first magnet, and a first position sensor, and a second driver including one second magnet mounted on the holder, a second coil opposing the one second magnet, and a second position sensor, wherein one sidewall of the holder and the other sidewall of the holder have different shapes.

Both the one first magnet and the one second magnet may be disposed on one sidewall of the holder.

In a state in which the one first magnet and the one second magnet are mounted, a center of gravity of the holder may be disposed to be close to one of the one sidewall and the other sidewall of the holder.

The reflective module may further include a sensing magnet mounted on the holder, wherein the first position sensor may include one or more hall sensors, and the second position sensor may include a plurality of hall sensors, one side of the one first magnet may have a first polarity and a second polarity in an optical axis direction, one side of the one second magnet may have a first polarity and a second polarity in a first axis direction, and the optical axis direction and the first axis direction may be perpendicular to each other, and may be perpendicular to a direction in which the one first magnet and the first coil oppose each other.

A size of an area of a portion of the one second magnet in which the first polarity is formed may be different from a size of an area of a portion in which the second polarity is formed, the first position sensor may oppose a polarity having a larger area among the polarities of the one second magnet, and the second position sensor may be disposed to oppose the sensing magnet and the one first magnet.

The first position sensor may oppose the one first magnet, and the second position sensor may be disposed to oppose the sensing magnet and the one second magnet.

The first position sensor may include a plurality of hall sensors, and the plurality of hall sensors of the first position sensor may be spaced apart from each other in the optical axis direction.

The plurality of hall sensors of the second position sensor may be spaced apart from each other in the first axis direction.

A length of the one first magnet in the first axis direction may be different from a length of the one second magnet in the first axis direction.

The reflective module may further include a sensing magnet mounted on the holder, the first position sensor may include one or more hall sensors, and the second position sensor may include a plurality of hall sensors, one side of the one first magnet may have a first polarity, a second polarity and a first polarity along the optical axis direction, one side of the one second magnet may have a first polarity and a second polarity along a first axis direction, and the optical axis direction and the first axis direction may be perpendicular to each other, and may be perpendicular to a direction in which the one first magnet and the first coil oppose each other.

The two first polarities of the one first magnet may have areas having different sizes, the first position sensor may oppose the second polarity of the one first magnet and the first polarity having a smaller area among the two first polarities of the one first magnet, and the second position sensor may be disposed to oppose the sensing magnet and the one second magnet.

The first position sensor may include a plurality of hall sensors, and the plurality of hall sensors of the first position sensor may be spaced apart from each other in the optical axis direction, and the plurality of hall sensors of the second position sensor may be spaced apart from each other in the first axis direction.

The reflective module may further include a sensing magnet mounted on the holder, the first position sensor may include one or more hall sensors, and the second position sensor may include a plurality of hall sensors, one side of the one first magnet may have a first polarity and a second polarity along the optical axis direction, one side of the one second magnet may have a first polarity, a second polarity and a first polarity along the first axis direction, and the optical axis direction and the first axis direction may be perpendicular to each other, and may be perpendicular to a direction in which the one first magnet and the first coil oppose each other.

The two first polarities of the one second magnet may have areas having different sizes, the second position sensor may oppose the second polarity of the one second magnet and the first polarity having a smaller area among the two first polarities of the one second magnet, and the first position sensor may be disposed to oppose the sensing magnet.

A portable electronic device may include the reflective module.

In another general aspect, a camera module includes a lens module including a plurality of lenses disposed along an optical axis, a housing configured to accommodate the lens module, a reflective module disposed on a front side of the lens module and including a reflective member configured to change a path of light and a holder on which the reflective member is mounted, a first driver including one first magnet mounted on the holder, a first coil opposing the one first magnet, and a first position sensor, and a second driver including one second magnet mounted on the holder, a second coil opposing the one second magnet, and a second position sensor, wherein the reflective module is configured to rotate with respect to a first axis and a second axis perpendicular to the optical axis and perpendicular to each other as rotational axes, and wherein, in a state in which the one first magnet and the one second magnet are mounted, a center of gravity of the reflective module is disposed to be close to one of one sidewall and the other sidewall of the holder.

The camera module may further include a sensing magnet mounted on the holder, the first position sensor may be configured to sense changes in a position of the reflective module rotating with respect to the first axis as a rotational axis, and may include one or more hall sensors, the second position sensor may be configured to sense changes in a position of the reflective module rotating with respect to the second axis as a rotational axis, and may include a plurality of hall sensors, and the plurality of hall sensors of the second position sensor may be spaced apart from each other along the first axis.

A portable electronic device may include the camera module.

In another general aspect, a reflective module includes a reflective member configured to change a path of light, and a holder on which a reflective member is mounted, and having a first sidewall and a second sidewall, wherein a first driving magnet configured to drive the holder in an optical axis direction is disposed on one of the first sidewall and the second sidewall and the other thereof is free of a first driving magnet, wherein a second driving magnet configured to drive the holder in a first direction perpendicular to the optical axis direction is disposed on one of the first sidewall and the second sidewall and the other thereof is free of a second driving magnet, and wherein a first driving coil and a second driving coil are disposed opposing the first driving magnet and the second driving magnet in a second direction perpendicular to the optical axis direction and the first direction.

A portable electronic device may include a camera module having a lens module including a plurality of lenses disposed along an optical axis, a housing configured to accommodate the lens module, and the reflective module disposed on a front side of the lens module.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
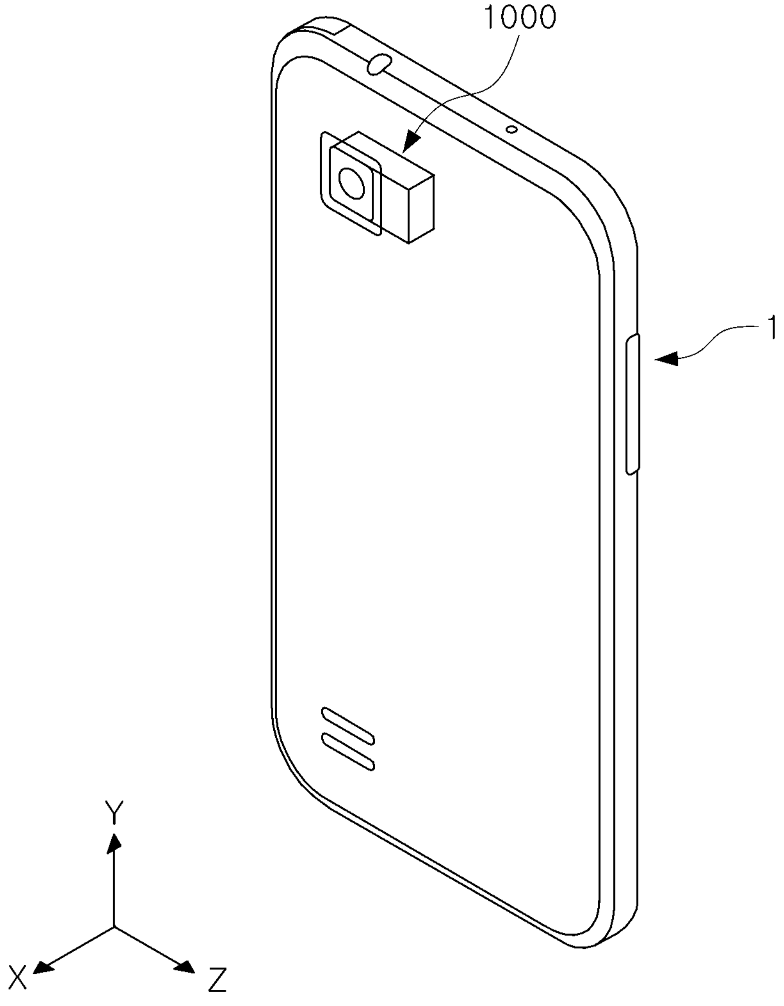
FIG. 1 is a perspective diagram illustrating a portable electronic device on which a camera module is mounted according to an embodiment of the present disclosure.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein.

However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" maybe used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures.

For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An embodiment of the present disclosure may provide a reflective module which may accurately sense a position of a reflective member. An embodiment of the present disclosure may provide a camera module including a reflective module which may accurately sense a position of a reflective member.

FIG. 1 is a perspective diagram illustrating a portable electronic device on which a camera module is mounted according to an embodiment.

Referring to FIG. 1, a camera module 1000 according to an embodiment may be mounted on a portable electronic device 1. The portable electronic device 1 maybe configured as a portable electronic device such as a mobile communication terminal, a smart phone, or a tablet PC.

As illustrated in FIG. 1, a camera module 1000 maybe mounted on a portable electronic device 1 to photograph a subject.

In the embodiment, camera module 1000 may include a plurality of lenses. The optical axis (Z-axis) of the plurality of lenses may be directed in a direction perpendicular to a thickness direction (the X-axis direction, a direction from a front surface of the portable electronic device to a rear surface or vice versa) of the portable electronic device 1.

For example, an optical axis (Z-axis) of a plurality of lenses provided in the camera module 1000 maybe formed in a width direction or a length direction of the portable electronic device 1.

Accordingly, even when the camera module 1000 has functions such as an autofocusing (hereinafter referred to as AF) function, an optical zoom (hereinafter referred to as zoom) function and an optical image stabilization (hereinafter referred to as OIS) function, the thickness of the portable electronic device 1 may not be increased. Accordingly, the thickness of the portable electronic device 1 maybe reduced.

The camera module 1000 according to an embodiment may include at least one of AF, zoom, and OIS functions.

Since the camera module 1000 having AF, zoom and OIS functions may need to include various components, the size of the camera module may increase as compared to a general camera module.

When the size of the camera module 1000 increases, it may be difficult to miniaturize the portable electronic device 1 to which the camera module 1000 is mounted.

For example, when a plurality of lenses are disposed in a thickness direction of the portable electronic device, the thickness of the portable electronic device may increase according to the number of lenses. Accordingly, the thickness of the portable electronic device may need to be increased to sufficiently secure the number of lenses.

However, since the optical axis (Z-axis) of the plurality of lenses of the camera module 1000 in an embodiment is disposed perpendicular to the thickness direction (X-axis direction) of the portable electronic device 1, the thickness of the portable electronic device 1 maybe reduced.

Figure 2:
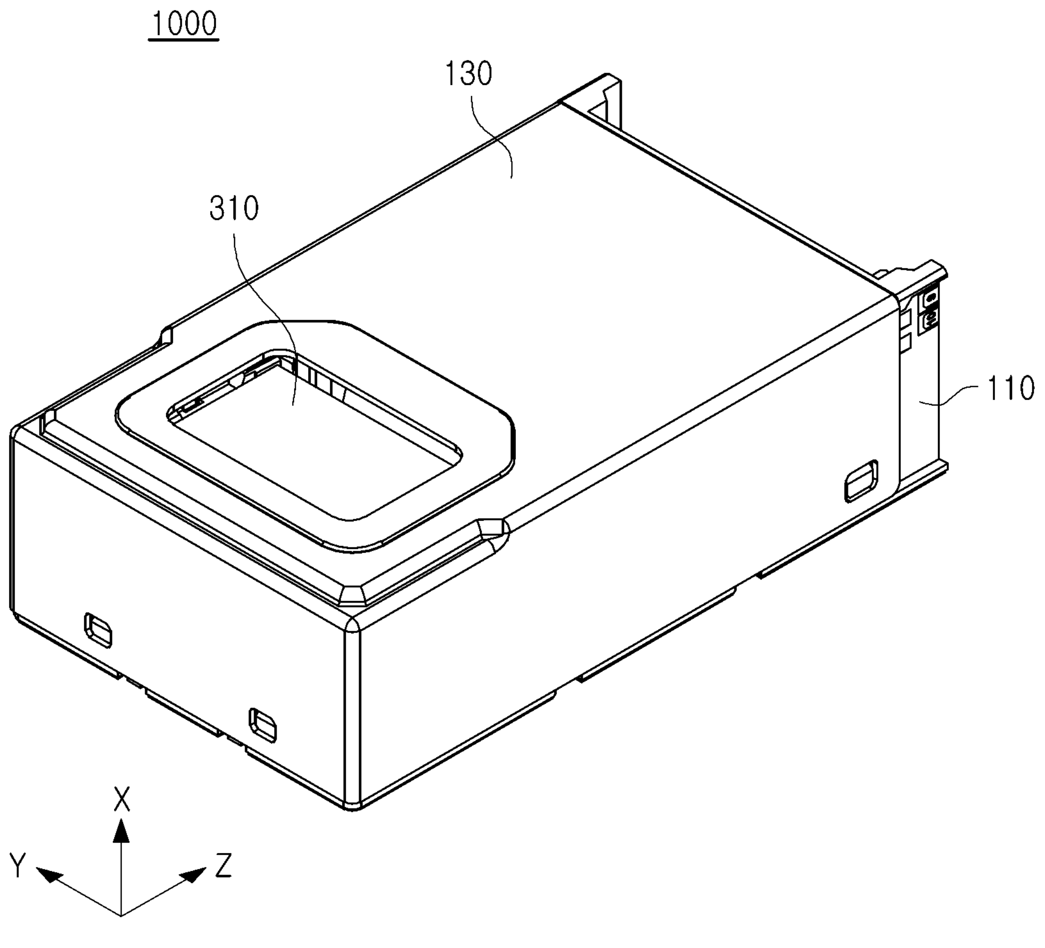
FIG. 2 is a perspective diagram illustrating a camera module according to an embodiment of the present disclosure.
Figure 3:
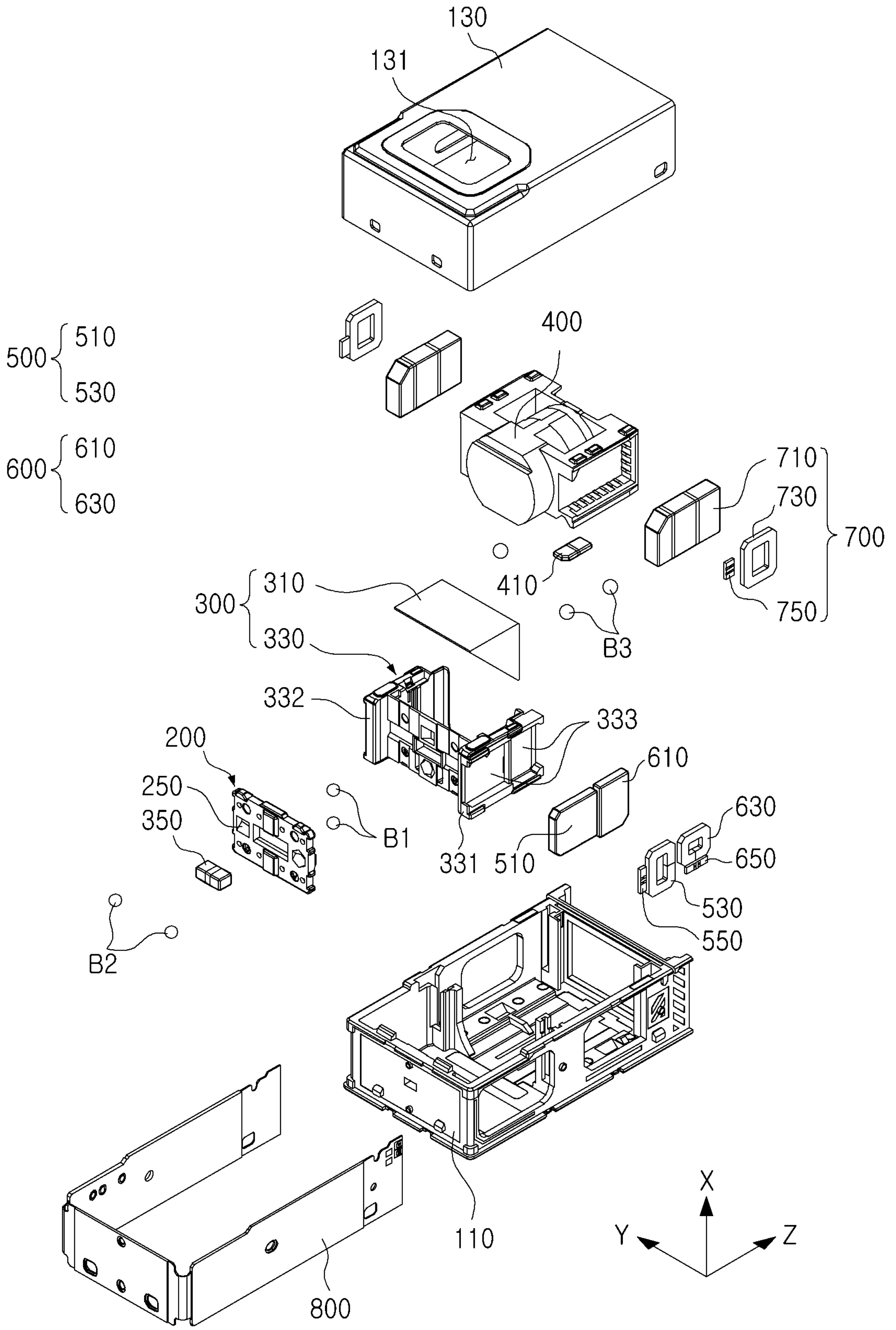
FIG. 3 is an exploded perspective diagram illustrating a camera module according to an embodiment of the present disclosure.

FIG. 2 is a perspective diagram illustrating a camera module according to an embodiment. FIG. 3 is an exploded perspective diagram illustrating a camera module according to an embodiment.

Referring to FIGS. 2 and 3, a camera module 1000 may include a housing 110, a reflective module 300, a lens module 400 and a case 130.

In the housing 110, a reflective module 300 and a lens module 400 may be disposed from one side toward the other side. The housing 110 may have an internal space to accommodate the reflective module 300 and the lens module 400. The housing 110 may have a box shape with an open upper portion.

An image sensor module may be coupled to the housing 110.

As illustrated in FIGS. 2 and 3, a reflective module 300 and a lens module 400 may be disposed in the housing 110.

As another embodiment, the reflective module 300 may be disposed externally of the housing 110, and in this case, one side surface of the housing 110 may be opened such that light transmitted from the reflective module 300 passes therethrough. Also, the reflective module 300 disposed externally of the housing 110 may be accommodated in a housing.

The case 130 may be coupled to the housing 110 to cover the upper portion of the housing 110. The case 130 may include an opening 131 through which light is incident. The traveling direction of the light incident through the opening 131 of the case 130 may change by the reflective module 300 and may be incident to the lens module 400.

The reflective module 300 may be configured to change the traveling direction of light. For example, the traveling direction of light incident into the housing 110 may change toward the lens module 400 through the reflective module 300.

The reflective module 300 may include a reflective member 310 and a holder 330 on which the reflective member 310 is mounted.

The reflective member 310 may be configured to change the traveling direction of light. For example, the reflective member 310 may be configured as a mirror or prism for reflecting light.

The path of light incident through the opening 131 of case 130 may change toward the lens module 400 by the reflective module 300. For example, the path of light incident in the thickness direction (X-axis direction) of the camera module 1000 may change by the reflective module 300 to substantially coincide with the optical axis direction (Z-axis direction).

When the reflective module 300 is disposed externally of the housing 110, the reflective module 300 may further include a separate housing accommodating the holder 330, and the first driver 500 and the second driver 600 providing driving force to the holder 330 may be disposed in the separate housing.

The lens module 400 may include a plurality of lenses through which light of which the traveling direction changes by the reflective member 310 may pass and a lens barrel accommodating the plurality of lenses.

The image sensor module may include an image sensor and a printed circuit board. The image sensor may be connected to the printed circuit board by a bonding wire.

The image sensor module may further include an infrared cut-off filter. An infrared cut filter may be attached to the housing 110. The infrared cut-off filter may block light of the infrared region from light passing through the lens module 400.

With respect to the lens module 400, the reflective module 300 may be disposed on the front side of the lens module 400 (−Z direction in FIG. 3), and an image sensor module may be disposed on the rear side of the lens module 400 (+Z direction in FIG. 3).

Figure 4:
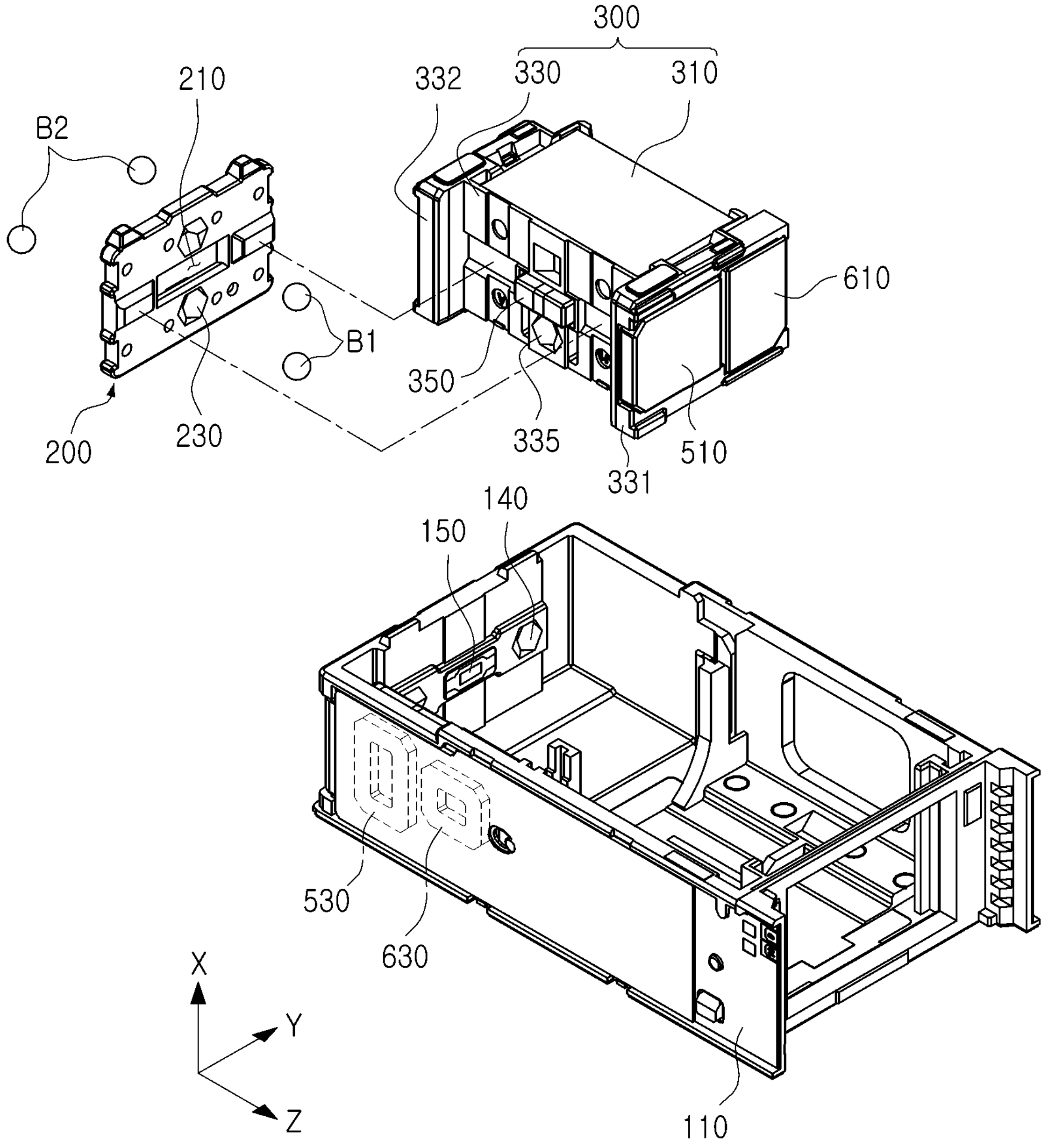
FIG. 4 is an exploded perspective diagram illustrating a housing and a reflective module according to an embodiment of the present disclosure.
Figure 5:
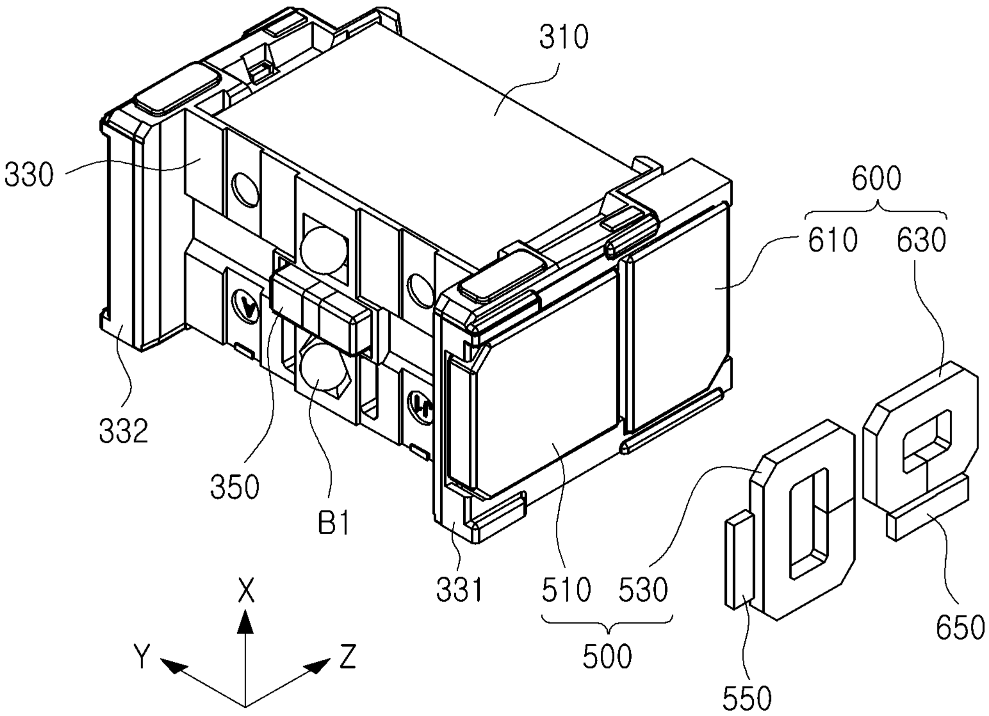
FIG. 5 is a perspective diagram illustrating a reflective module according to an embodiment of the present disclosure.
Figure 6:
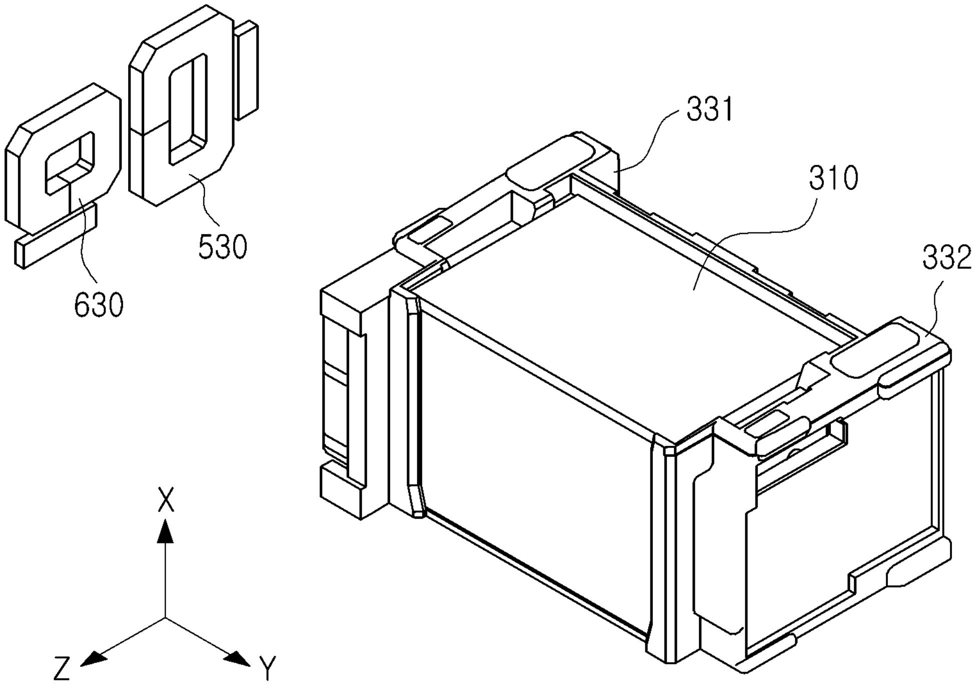
FIG. 6 is a perspective diagram illustrating the example in FIG. 5, viewed in a different direction.

FIG. 4 is an exploded perspective diagram illustrating a housing and a reflective module according to an embodiment. FIG. 5 is a perspective diagram illustrating a reflective module according to an embodiment. FIG. 6 is a perspective diagram illustrating the example in FIG. 5, viewed in a different direction.

Referring to FIGS. 4 to 6, a reflective module 300 may include a reflective member 310 and a holder 330 to which the reflective member 310 is mounted.

The holder 330 may include a first sidewall 331 and a second sidewall 332 surrounding both side surfaces of the reflective member 310. The first sidewall 331 may be disposed to cover one side surface of the reflective member 310, and the second sidewall 332 may be disposed to surround the other side surface of the reflective member 310.

Also, the holder 330 may include a mounting surface on which the reflective member 310 is mounted. The mounting surface may be disposed between the first sidewall 331 and the second sidewall 332, and the mounting surface may be configured as an inclined surface.

As an example, the mounting surface may be an inclined surface inclined by approximately 45° with respect to an optical axis (Z-axis) of a plurality of lenses. The reflective surface of the reflective member 310 may be coupled to the mounting surface of the holder 330.

The first sidewall 331 and the second sidewall 332 of the holder 330 may protrude in the optical axis (Z-axis) direction to surround the guide member 200 (see FIG. 4). For example, the first sidewall 331 and the second sidewall 332 of the holder 330 may protrude further in the optical axis (Z-axis) direction than the first receiving groove 335 of the holder 330.

The reflective module 300 may be disposed in the internal space of the housing 110 and may be pulled toward the housing 110. For example, the reflective module 300 may be pulled toward the internal side surface of the housing 110 in the optical axis (Z-axis) direction.

To this end, magnetic materials may be disposed in the housing 110 and the reflective module 300, respectively. At least one of the magnetic materials disposed in the housing 110 and the reflective module 300 may be a magnet. For example, a pulling yoke 150 may be disposed in the housing 110, and a pulling magnet 350 may be disposed in the reflective module 300. The pulling yoke 150 and the pulling magnet 350 may be disposed to oppose each other in the optical axis (Z-axis) direction. The pulling yoke 150 may be a magnetic material.

Accordingly, the pulling yoke 150 and the pulling magnet 350 may generate an attractive force in the optical axis (Z-axis) direction, and accordingly, the reflective module 300 may be pressed toward the housing 110.

The mounting positions of the pulling yoke 150 and the pulling magnet 350 may be interchanged. As another embodiment, the pulling magnet 350 may be mounted on each of the housing 110 and the reflective module 300.

A guide member 200 may be disposed on the front side of the holder 330. The guide member 200 may be disposed between the internal side surface of the housing 110 and the holder 330. For example, the guide member 200 may be disposed between the internal side surface of the housing 110 on which the pulling yoke 150 may be disposed and the holder 330 on which the pulling magnet 350 may be disposed.

The guide member 200 may have a plate shape, and may have a through-hole 210 such that the pulling yoke 150 and the pulling magnet 350 may oppose each other directly.

Since the pulling yoke 150 and the pulling magnet 350 may be disposed to directly oppose each other, the pulling force of the reflective module 300 may be increased.

Since the attractive force acts in the optical axis (Z-axis) direction between the pulling yoke 150 and the pulling magnet 350, and accordingly, the holder 330 and the guide member 200 may press toward the housing 110 in the optical axis (Z-axis) direction.

A first ball member B1 may be disposed between the guide member 200 and the holder 330, and a second ball member B2 may be disposed between the housing 110 and the guide member 200.

The first ball member B1 may include a plurality of ball members spaced apart from each other along the first axis (X-axis), and the second ball member B2 may include a plurality of ball members spaced apart from each other along the second axis (Y-axis).

The first ball member B1 may form a rotational axis of the holder 330 when the holder 330 rotates with respect to the guide member 200. When the guide member 200 rotates with respect to the housing 110, the second ball member B2 may form a rotational axis of the guide member 200.

Due to the attractive force between the pulling yoke 150 and the pulling magnet 350, the first ball member B1 may be in contact with the guide member 200 and the holder 330, and the second ball member B2 may be in contact with the housing 110 and the guide member 200.

A receiving groove in which the first ball member B1 is accommodated may be provided on the surface on which the guide member 200 and the holder 330 may oppose each other. For example, a first receiving groove 335 and a second receiving groove 230 may be provided on a surface on which the guide member 200 and the holder 330 may oppose each other in the optical axis (Z-axis) direction, and the first ball member B1 may be disposed between the first receiving groove 335 and the second receiving groove 230.

Each of the first receiving groove 335 and the second receiving groove 230 include a plurality of receiving grooves spaced apart from each other along the first axis (X-axis).

A receiving groove in which the second ball member B2 is accommodated may be provided on the surface on which the housing 110 and the guide member 200 may oppose each other. For example, a third receiving groove 250 and a fourth receiving groove 140 may be provided on the surface on which the housing 110 and the guide member 200 may oppose each other in the optical axis (Z-axis) direction, and the second ball member B2 may be disposed between the third receiving groove 250 and the fourth receiving groove 140.

Each of the third receiving groove 250 and the fourth receiving groove 140 include a plurality of receiving grooves spaced apart from each other along the second axis (Y-axis).

The camera module 1000 according to an embodiment may correct shaking during photographing by rotating the reflective module 300.

For example, when shaking occurs during photographing, the shaking may be corrected by applying a relative displacement corresponding to the shaking to the reflective module 300.

The reflective module 300 may rotate with respect to the first axis (X-axis) and the second axis (Y-axis). For example, the reflective module 300 may rotate relative to the guide member 200 using the first axis (X-axis) as a rotational axis. Also, the reflective module 300 may rotate relative to the housing 110 together with the guide member 200 using the second axis (Y-axis) as a rotational axis.

A first ball member B1 may be disposed between the guide member 200 and the reflective module 300, and the first ball member B1 may include a plurality of ball members disposed along the first axis (X-axis). Accordingly, the reflective module 300 may rotate with the first axis (X-axis) as a rotational axis while being supported by the first ball member B1.

Since the first ball member B1 includes a plurality of ball members disposed along the first axis (X-axis), the reflective module 300 may rotate relative to the guide member 200 with the first axis (X-axis) as a rotational axis. The rotation of the reflective module 300 relative to the guide member 200 with the second axis (Y-axis) as a rotational axis may be restricted.

A second ball member B2 may be disposed between the housing 110 and the guide member 200, and the second ball member B2 may include a plurality of ball members disposed along the second axis (Y-axis). Accordingly, the guide member 200 may rotate using the second axis (Y-axis) as a rotational axis while being supported by the second ball member B2.

Since the second ball member B2 includes a plurality of ball members disposed along the second axis (Y-axis), the guide member 200 may rotate relative to the housing 110 with the second axis (Y-axis) as a rotational axis. The rotation of the guide member 200 relative to the housing 110 with the first axis (X-axis) as a rotational axis may be restricted.

Here, when the guide member 200 rotates with the second axis (Y-axis) as a rotational axis, the reflective module 300, together with the guide member 200, may rotate relative to the housing 110 with the second axis (Y-axis) as a rotational axis.

A driver may be provided to rotate the reflective module 300. For example, the camera module 1000 according to an embodiment may include a first driver 500 rotating the reflective module 300 with the first axis (X-axis) as a rotational axis, and a second driver 600 rotating the reflective module 300 with the second axis (Y-axis) as a rotational axis.

The first driver 500 may include a first magnet 510 and a first coil 530.

The first magnet 510 may be mounted on the reflective module 300. For example, the first magnet 510 may be disposed on one sidewall (e.g., a first sidewall 331) of the holder 330.

The first coil 530 may be disposed to oppose the first magnet 510 in a direction perpendicular to the optical axis (Z-axis) direction. For example, the housing 110 may include a through-hole in which the first coil 530 may be disposed, and the first coil 530 may be disposed in the through-hole to oppose the first magnet 510 in the second axis (Y-axis) direction. The first coil 530 may be disposed on the substrate 800 coupled to the housing 110.

The first magnet 510 may refer to a magnet disposed on one sidewall of the holder 330, and the first coil 530 also may refer to a coil disposed on the housing 110.

The second driver 600 may include a second magnet 610 and a second coil 630.

The second magnet 610 may be mounted on the reflective module 300. For example, the second magnet 610 may be disposed on one sidewall (e.g., first sidewall 331) of the holder 330.

The second coil 630 may be disposed to oppose the second magnet 610 in a direction perpendicular to the optical axis (Z-axis) direction. For example, the housing 110 may include a through-hole in which the second coil 630 may be disposed, and the second coil 630 may be disposed in the through-hole to oppose the second magnet 610 in the second axis (Y-axis) direction. The second coil 630 may be disposed on the substrate 800 coupled to the housing 110.

The second magnet 610 may refer to a magnet disposed on one sidewall of the holder 330, and the second coil 630 also may refer to a coil disposed on the housing 110.

The reflective module 300 may rotate using the first axis (X-axis) as a rotational axis, and the reflective module 300 and the guide member 200 may rotate together using the second axis (Y-axis) as a rotational axis.

For example, the reflective module 300 may rotate left and right using the first axis (X-axis) as a rotational axis, and may rotate upwardly and downwardly using the second axis (Y-axis) as a rotational axis.

The camera module 1000 according to an embodiment may sense the position of the reflective module 300.

Accordingly, a first position sensor 550 and a second position sensor 650 may be provided to sense the position of the reflective module 300.

In an embodiment, both the first magnet 510 and the second magnet 610 may be disposed on one sidewall of the reflective module 300.

That is, the first magnet 510 and the second magnet 610 may be disposed on only one sidewall of the first sidewall 331 and the second sidewall 332 of the reflective module 300. In the embodiment, the first magnet 510 and the second magnet 610 may be disposed on the first sidewall 331 of the reflective module 300.

In the first sidewall 331, a seating groove 333 for coupling the first magnet 510 to the second magnet 610 may be formed. Since no magnet is mounted on the second sidewall 332, the first sidewall 331 and the second sidewall 332 may have different shapes when viewed in the second axis (Y-axis) direction.

Since both the first magnet 510 and the second magnet 610 are disposed only on the first sidewall 331, the center of gravity of the reflective module 300 may be formed to be closer to the first sidewall 331 than the second sidewall 332 when the first magnet 510 and the second magnet 610 are installed.

In another embodiment, a first magnet 510 may be disposed on one sidewall of the reflective module 300, and a second magnet 610 may be disposed on the other sidewall of the reflective module 300.

For example, the first magnet 510 may be disposed on the first sidewall 331 of the reflective module 300, and the second magnet 610 may be disposed on the second sidewall 332 of the reflective module 300.

The size of the first magnet 510 and the size of the second magnet 610 may be formed differently.

In a state in which the first magnet 510 and the second magnet 610 are mounted, the center of gravity of the reflective module 300 may be formed closer to the first sidewall 331 or the second sidewall 332. For example, the center of gravity of the reflective module 300 may be formed closer to a magnet having a larger size among the first magnet 510 and the second magnet 610.

Also, since the size of the first magnet 510 and the size of the second magnet 610 are formed differently, the shape of the seating grooves 333 of the reflective module 300 for mounting the magnets may also be different. Accordingly, when viewed in the second axis (Y-axis) direction, the first sidewall 331 and the second sidewall 332 may have different shapes.

Figure 7:
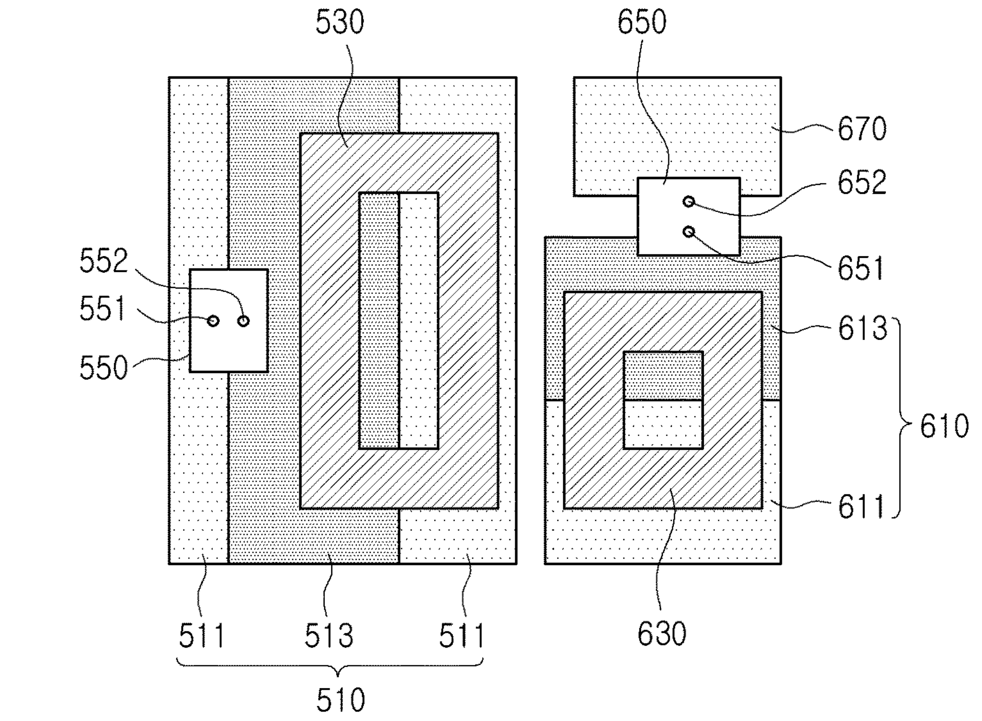
FIG. 7 is a diagram illustrating a first driver and a second driver according to a first embodiment.

FIG. 7 is a diagram illustrating a first driver and a second driver according to a first embodiment.

Referring to FIG. 7, a first driver 500 may include a first magnet 510 and a first coil 530, and a second driver 600 may include a second magnet 610 and a second coil 630. When viewed in the second axis (Y-axis) direction, FIG. 7 illustrates the example in which the first magnet 510 and the first coil 530 overlap each other, and the second magnet 610 and the second coil 630 overlap each other.

Each of the first magnet 510 and the second magnet 610 may include one magnet. Both the first magnet 510 and the second magnet 610 may be disposed on the first sidewall 331 of the reflective module 300. As another embodiment, the first magnet 510 may be disposed on the first sidewall 331 of the reflective module 300 and the second magnet 610 may be disposed on the second sidewall 332 of the reflective module 300.

The first coil 530 may be disposed to oppose the first magnet 510 in the second axis (Y-axis) direction, and the second coil 630 may be disposed to oppose the second magnet 610 in the second axis (Y-axis) direction.

One side of the first magnet 510 opposing the first coil 530 may have a first polarity 511, a second polarity 513, and a first polarity 511 magnetized along the optical axis (Z-axis) direction.

For example, one side of the first magnet 510 may have a first polarity 511, a second polarity 513, and a first polarity 511 in order in the optical axis (Z-axis) direction. The first polarity 511 may be an N pole or an S pole, and the second polarity 513 may have a polarity opposite to that of the first polarity 511. A neutral region may be formed between the first polarity 511 and the second polarity 513.

The two first polarities 511 of the first magnet 510 may have different sizes of areas. For example, an area of a portion in which one of the two first polarities 511 is formed on one side of the first magnet 510 may be larger than an area of a portion in which the other of the two first polarities 511 is formed.

The first coil 530 may be disposed to oppose one of the first polarity 511 among the two first polarities 511 and the second polarity 513. That is, the first coil 530 may not oppose the first polarity 511 of the other polarity of the two first polarities 511.

For example, the first coil 530 may oppose a first polarity 511 having a larger area among two first polarities 511 of the first magnet 510.

The first magnet 510 and the first coil 530 may generate driving force in a direction perpendicular to the directions opposing each other. For example, the first magnet 510 and the first coil 530 may generate driving force in the optical axis (Z-axis) direction.

Accordingly, by the driving force of the first magnet 510 and the first coil 530, the reflective module 300 may rotate with the first axis (X-axis) as a rotational axis.

On one side of the second magnet 610 opposing the second coil 630, the first polarity 611 and the second polarity 613 may be magnetized along a direction perpendicular to the optical axis (Z-axis) direction.

For example, one side of the second magnet 610 may have a first polarity 611 and a second polarity 613 in order in the first axis (X-axis) direction. The first polarity 611 may be configured as an N pole or an S pole, and the second polarity 613 may have a polarity opposite to that of the first polarity 611. A neutral region may be formed between the first polarity 611 and the second polarity 613.

The second coil 630 may be disposed to oppose the first polarity 611 and the second polarity 613.

The second magnet 610 and the second coil 630 may generate driving force in a direction perpendicular to the directions opposing each other. For example, the second magnet 610 and the second coil 630 may generate driving force in the first axis (X-axis) direction.

Accordingly, by the driving force of the second magnet 610 and the second coil 630, the reflective module 300 and the guide member 200 may rotate with the second axis (Y-axis) as a rotational axis.

The first driver 500 and the second driver 600 may generate driving forces in directions perpendicular to each other.

The length of the first magnet 510 in the first axis (X-axis) direction may be longer than the length of the second magnet 610 in the first axis (X-axis) direction. The length of the first magnet 510 in the optical axis (Z-axis) direction may be longer than the length of the second magnet 610 in the optical axis (Z-axis) direction.

The length of the first coil 530 in the first axis (X-axis) direction may be longer than the length of the second coil 630 in the first axis (X-axis) direction.

The first driver 500 may further include a first position sensor 550, and the second driver 600 may further include a second position sensor 650.

When the reflective module 300 may rotate with respect to the first axis (X-axis), the position of the reflective module 300 may be sensed by the first position sensor 550.

When the reflective module 300 rotates with respect to the second axis (Y-axis), the position of the reflective module 300 may be sensed by the second position sensor 650.

The first position sensor 550 may be disposed to oppose the first magnet 510. For example, the first position sensor 550 may oppose the first magnet 510 in the second axis (Y-axis) direction.

The second driver 600 may further include a sensing magnet 670. The sensing magnet 670 may be disposed on the first sidewall 331 of the holder 330 and may be spaced apart from the second magnet 610 in the first axis (X-axis) direction.

The second position sensor 650 may be disposed to oppose the second magnet 610 and the sensing magnet 670. For example, the second position sensor 650 may be disposed to oppose the second magnet 610 and the sensing magnet 670 in the second axis (Y-axis) direction.

Each of the first position sensor 550 and the second position sensor 650 may include a plurality of hall sensors. For example, each of the first position sensor 550 and the second position sensor 650 may include two hall sensors.

For example, the first position sensor 550 may include two hall sensors 551 and 552 disposed in the optical axis (Z-axis) direction. One of the two hall sensors 551 and 552 of the first position sensor 550 may oppose the first polarity 511 of the first magnet 510, and the other 552 may oppose the second polarity 513 of the first magnet 510.

The first polarity 511 of the first magnet 510 opposing one of the two hall sensors 551 and 552 of the first position sensor 550 may be a first polarity 511 having a smaller area among the two first polarities 511 of the first magnet 510. For reference, the other of the two first polarities 511 of the first magnet 510 (the first polarity having a larger area) may oppose the first coil 530.

When the reflective module 300 rotates with respect to the first axis (X-axis) by the first driver 500, the distance between the first magnet 510 and the first position sensor 550 in the second axis (Y-axis) direction may also change.

In the embodiment, the first position sensor 550 may include two hall sensors 551 and 552, one 551 of the two hall sensors 551 and 552 may oppose the first polarity 511 of the first magnet 510, and the other 552 of the two hall sensors 551 and 552 may oppose the second polarity 513 of the first magnet 510.

Accordingly, when the distance between one 551 of the two hall sensors 551 and 552 and the first polarity 511 decreases, the distance between the other 552 of the two hall sensors 551 and 552 and the second polarity 513 may increase (and vice versa).

Accordingly, the position of the reflective module 300 may be accurately measured through the change in magnetic flux of the first magnet 510 sensed by each of the two hall sensors 551 and 552 of the first position sensor 550. Also, since the first position sensor 550 may include two hall sensors 551 and 552, the influence of disturbances such as changes in temperature may be reduced when measuring the position of the reflective module 300.

The second position sensor 650 may include two hall sensors 651 and 652 disposed in the first axis (X-axis) direction. For example, one of the two hall sensors 651 and 652 of the second position sensor 650 may be disposed closer to the second magnet 610 and the other 652 may be disposed closer to the sensing magnet 670.

When the reflective module 300 rotates about the second axis (Y-axis) by the second driver 600, the two hall sensors 651 and 652 of the second position sensor 650 may become closer to one of the sensing magnet 670 and the second magnet 610, and may become spaced farther apart from the other.

Accordingly, the position of the reflective module 300 may be precisely measured through the magnetic flux change of the sensing magnet 670 and the magnetic flux change of the second magnet 610 sensed by the two hall sensors 651 and 652 of the second position sensor 650, respectively. Also, since the second position sensor 650 may include the two hall sensors 651 and 652, the influence of disturbances such as temperature change may be reduced when measuring the position of the reflective module 300.

Figure 8:
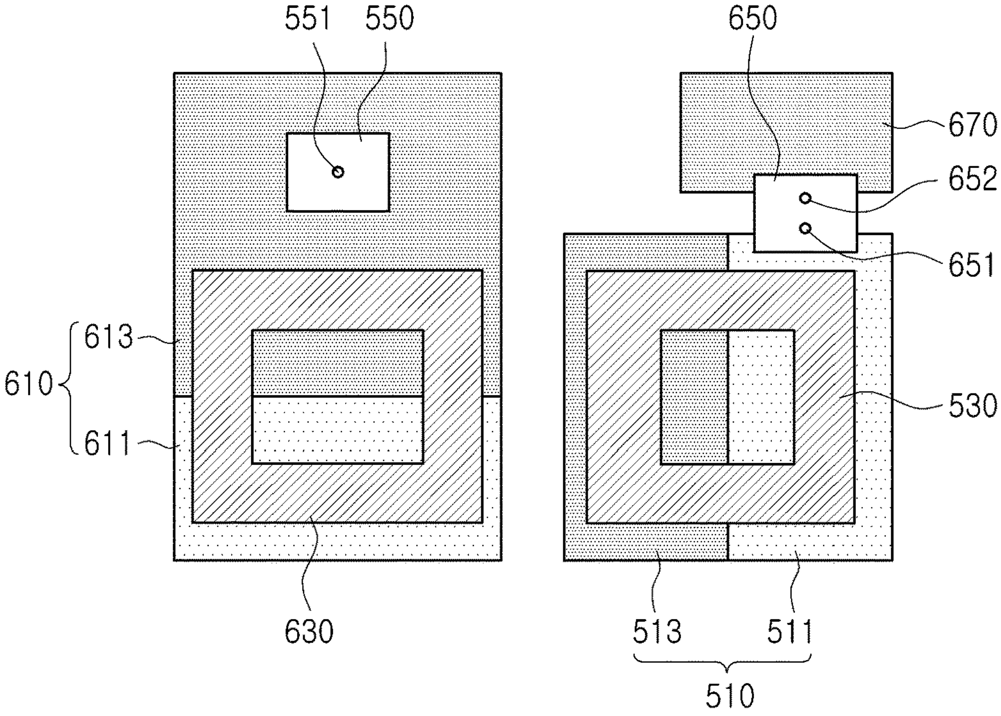
FIG. 8 is a diagram illustrating a first driver and a second driver according to a second embodiment.

FIG. 8 is a diagram illustrating a first driver and a second driver according to a second embodiment.

Referring to FIG. 8, a first driver 500 may include a first magnet 510 and a first coil 530, and a second driver 600 may include a second magnet 610 and a second coil 630. When viewed in the second axis (Y-axis) direction, FIG. 8 illustrates the example in which the first magnet 510 and the first coil 530 overlap each other, and the second magnet 610 and the second coil 630 overlap each other.

Each of the first magnet 510 and the second magnet 610 may include one magnet. Both the first magnet 510 and the second magnet 610 may be disposed on the first sidewall 331 of the reflective module 300. As another embodiment, the first magnet 510 may be disposed on the first sidewall 331 of the reflective module 300 and the second magnet 610 may be disposed on the second sidewall 332 of the reflective module 300.

The first coil 530 may be disposed to oppose the first magnet 510 in the second axis (Y-axis) direction, and the second coil 630 may be disposed to oppose the second magnet 610 in the second axis (Y-axis) direction.

One side of the first magnet 510 opposing the first coil 530 may have a first polarity 511 and a second polarity 513 magnetized along the optical axis (Z-axis) direction.

For example, one side of the first magnet 510 may have a first polarity 511 and a second polarity 513 in order in the optical axis (Z-axis) direction. The first polarity 511 may be an N pole or an S pole, and the second polarity 513 may have a polarity opposite to that of the first polarity 511. A neutral region may be formed between the first polarity 511 and the second polarity 513.

The first coil 530 may be disposed to oppose the first polarity 511 and the second polarity 513.

The first magnet 510 and the first coil 530 may generate driving force in a direction perpendicular to the directions opposing each other. For example, the first magnet 510 and the first coil 530 may generate driving force in the optical axis (Z-axis) direction.

Accordingly, by the driving force of the first magnet 510 and the first coil 530, the reflective module 300 may rotate with the first axis (X-axis) as a rotational axis.

On one side of the second magnet 610 opposing the second coil 630, the first polarity 611 and the second polarity 613 may be magnetized along a direction perpendicular to the optical axis (Z-axis) direction.

For example, one side of the second magnet 610 may have a first polarity 611 and a second polarity 613 in order in the first axis (X-axis) direction. The first polarity 611 may be an N pole or an S pole, and the second polarity 613 may have a polarity opposite to that of the first polarity 611. A neutral region may be formed between the first polarity 611 and the second polarity 613.

The first polarity 611 and the second polarity 613 of the second magnet 610 may have different size areas. For example, on one side of the second magnet 610, an area of a portion in which one of the first polarity 611 and the second polarity 613 is formed may be larger than the area of a portion in which the other polarity is formed.

The second coil 630 may be disposed to oppose the first polarity 611 and the second polarity 613.

The second magnet 610 and the second coil 630 may generate driving force in a direction perpendicular to the directions opposing each other. For example, the second magnet 610 and the second coil 630 may generate driving force in the first axis (X-axis) direction.

Accordingly, by the driving force of the second magnet 610 and the second coil 630, the reflective module 300 and the guide member 200 may rotate with the second axis (Y-axis) as a rotational axis.

The first driver 500 and the second driver 600 may generate driving forces in directions perpendicular to each other.

The length of the second magnet 610 in the first axis (X-axis) direction may be longer than the length of the first magnet 510 in the first axis (X-axis) direction.

The first driver 500 may further include a first position sensor 550, and the second driver 600 may further include a second position sensor 650.

When the reflective module 300 rotates with respect to the first axis (X-axis), the position of the reflective module 300 may be sensed by the first position sensor 550.

When the reflective module 300 rotates with respect to the second axis (Y-axis), the position of the reflective module 300 may be sensed by the second position sensor 650.

The first position sensor 550 may be disposed to oppose the second magnet 610. For example, the first position sensor 550 may oppose the second magnet 610 in the second axis (Y-axis) direction. The first position sensor 550 may oppose a polarity having a larger area among the first polarity 611 and the second polarity 613 of the second magnet 610.

The first position sensor 550 may include one or more hall sensors.

When the reflective module 300 rotates with respect to the first axis (X-axis) by the first driver 500, the distance between the second magnet 610 and the first position sensor 550 in the second axis (Y-axis) direction may also change.

Accordingly, the position of the reflective module 300 may be precisely measured through the change in magnetic flux of the second magnet 610 sensed by the first position sensor 550.

Also, when the first position sensor 550 includes a plurality of hall sensors, the influence of disturbances such as temperature change may be reduced when measuring the position of the reflective module 300.

The second driver 600 may further include a sensing magnet 670. The sensing magnet 670 may be disposed on the first sidewall 331 of the holder 330 and may be spaced apart from the first magnet 510 in the first axis (X-axis) direction.

The second position sensor 650 may oppose the first magnet 510 and the sensing magnet 670. For example, the second position sensor 650 may be disposed to oppose the first magnet 510 and the sensing magnet 670 in the second axis (Y-axis) direction. A portion of the first magnet 510 opposing the second position sensor 650 may be one of first polarity 511 and second polarity 513 of the first magnet 510.

The second position sensor 650 may include a plurality of hall sensors. For example, the second position sensor 650 may include two hall sensors.

For example, the second position sensor 650 may include two hall sensors 651 and 652 disposed in the first axis (X-axis) direction. For example, one 651 of the two hall sensors 651 and 652 of the second position sensor 650 may be disposed closer to the first magnet 510 and the other 652 may be disposed closer to the sensing magnet 670.

When the reflective module 300 rotates about the second axis (Y-axis) by the second driver 600, the two hall sensors 651 and 652 of the second position sensor 650 may become closer to one of the sensing magnet 670 and the first magnet 510 and may become spaced farther apart from the other.

Accordingly, the position of the reflective module 300 may be precisely measured through the magnetic flux change of the sensing magnet 670 and the magnetic flux change of the first magnet 510 sensed by the two hall sensors 651 and 652 of the second position sensor 650, respectively. Also, since the second position sensor 650 may include two hall sensors 651 and 652, the influence of disturbances such as temperature change may be reduced when measuring the position of the reflective module 300.

Figure 9:
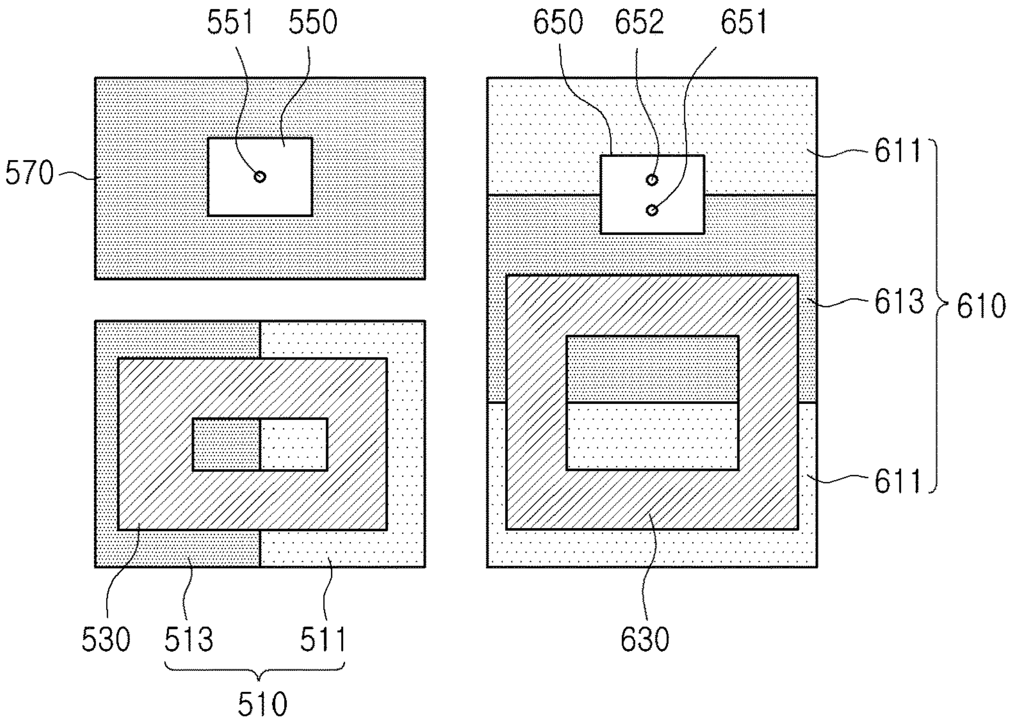
FIG. 9 is a diagram illustrating a first driver and a second driver according to a third embodiment.

FIG. 9 is a diagram illustrating a first driver and a second driver according to a third embodiment.

Referring to FIG. 9, a first driver 500 may include a first magnet 510 and a first coil 530, and a second driver 600 may include a second magnet 610 and a second coil 630. When viewed in the second axis (Y-axis) direction, FIG. 9 illustrates the example in which the first magnet 510 and the first coil 530 overlap each other, and the second magnet 610 and the second coil 630 overlap each other.

The first magnet 510 and the second magnet 610 may each include one magnet. Both the first magnet 510 and the second magnet 610 may be disposed on the first sidewall 331 of the reflective module 300. As another embodiment, the first magnet 510 may be disposed on the first sidewall 331 of the reflective module 300 and the second magnet 610 may be disposed on the second sidewall 332 of the reflective module 300.

The first coil 530 may be disposed to oppose the first magnet 510 in the second axis (Y-axis) direction, and the second coil 630 may be disposed to oppose the second magnet 610 in the second axis (Y-axis) direction.

One side of the first magnet 510 opposing the first coil 530 may have a first polarity 511 and a second polarity 513 magnetized along the optical axis (Z-axis) direction.

For example, one side of the first magnet 510 may have a first polarity 511 and a second polarity 513 in order in the optical axis (Z-axis) direction. The first polarity 511 may be an N pole or an S pole, and the second polarity 513 may have a polarity opposite to that of the first polarity 511. A neutral region may be formed between the first polarity 511 and the second polarity 513.

The first magnet 510 and the first coil 530 may generate driving force in a direction perpendicular to the directions opposing each other. For example, the first magnet 510 and the first coil 530 may generate driving force in the optical axis (Z-axis) direction.

Accordingly, by the driving force of the first magnet 510 and the first coil 530, the reflective module 300 may rotate with the first axis (X-axis) as a rotational axis.

One side of the second magnet 610 opposing the second coil 630 may have the first polarity 611, the second polarity 613, and the first polarity 611 magnetized along a direction perpendicular to the optical axis (Z-axis) direction.

For example, one side of the second magnet 610 may have the first polarity 611, the second polarity 613, and the first polarity 611 in order in the first axis (X-axis) direction. The first polarity 611 may be an N pole or an S pole, and the second polarity 613 may have a polarity opposite to that of the first polarity 611. A neutral region may be formed between the first polarity 611 and the second polarity 613.

The two first polarities 611 of the second magnet 610 may have areas having different sizes. For example, on one side of the second magnet 610, the area of a portion in which one of the two first polarities 611 is formed may be larger than the area of a portion in which the other is formed.

The second coil 630 may be disposed to oppose one of the first polarity 611 of the two first polarities 611 and the second polarity 613. That is, the second coil 630 may not oppose the other first polarity 611 of the two first polarities 611.

For example, the second coil 630 may oppose the first polarity 611 having a larger area among the two first polarities 611 of the second magnet 610.

The second magnet 610 and the second coil 630 may generate driving force in a direction perpendicular to the directions opposing each other. For example, the second magnet 610 and the second coil 630 may generate driving force in the first axis (X-axis) direction.

Accordingly, by the driving force of the second magnet 610 and the second coil 630, the reflective module 300 may rotate along with the guide member 200 using the second axis (Y-axis) as a rotational axis.

The first driver 500 and the second driver 600 may generate driving forces in directions perpendicular to each other.

The length of the second magnet 610 in the first axis (X-axis) direction may be longer than the length of the first magnet 510 in the first axis (X-axis) direction.

The length of the second coil 630 in the first axis (X-axis) direction may be longer than the length of the first coil 530 in the first axis (X-axis) direction.

The first driver 500 may further include a first position sensor 550, and the second driver 600 may further include a second position sensor 650.

When the reflective module 300 rotates with respect to the first axis (X-axis), the position of the reflective module 300 may be sensed by the first position sensor 550.

When the reflective module 300 rotates with respect to the second axis (Y-axis), the position of the reflective module 300 may be sensed by the second position sensor 650.

The first driver 500 may further include a sensing magnet 570. The sensing magnet 570 may be disposed on the first sidewall 331 of the holder 330 and may be spaced apart from the first magnet 510 in the first axis (X-axis) direction.

The first position sensor 550 may be disposed to oppose the sensing magnet 570. For example, the first position sensor 550 may oppose the sensing magnet 570 in the second axis (Y-axis) direction.

The first position sensor 550 may include one or more hall sensors.

When the reflective module 300 rotates with respect to the first axis (X-axis) by the first driver 500, the distance between the first position sensor 550 and the sensing magnet 570 in the second axis (Y-axis) direction may also change.

Accordingly, the position of the reflective module 300 may be precisely measured through a change in magnetic flux of the sensing magnet 570 sensed by the first position sensor 550.

Also, when the first position sensor 550 includes a plurality of hall sensors, the influence of disturbances such as temperature change may be reduced when measuring the position of the reflective module 300.

The second position sensor 650 may be disposed to oppose the second magnet 610. For example, the second position sensor 650 may be disposed to oppose the second magnet 610 in the second axis (Y-axis) direction.

The second position sensor 650 may include a plurality of hall sensors. For example, the second position sensor 650 may include two hall sensors.

For example, the second position sensor 650 may include two hall sensors 651 and 652 disposed in the first axis (X-axis) direction. One of the two hall sensors 651 and 652 of the second position sensor 650 may oppose the first polarity 611 of the second magnet 610, and the other 651 may oppose the second polarity 613 of the second magnet 610.

The first polarity 611 of the second magnet 610 opposing one of the two hall sensors 651 and 652 of the second position sensor 650 may be the other first polarity 611 having a smaller area among the two first polarities 611 of the second magnet 610. For reference, the one first polarity 611 having a larger area of the two first polarities 611 of the second magnet 610 may oppose the second coil 630.

When the reflective module 300 rotates about the second axis (Y-axis) by the second driver 600, the two hall sensors 651 and 652 of the second position sensor 650 may move closer to one of the first polarity 611 and the second polarity 613 of the second magnet 610 and may be spaced farther apart from the other.

Accordingly, the position of the reflective module 300 may be precisely measured through the change in magnetic flux of the second magnet 610 sensed by the two hall sensors 651 and 652 of the second position sensor 650, respectively. Also, since the second position sensor 650 includes two hall sensors 651 and 652, the influence of disturbances such as temperature change may be reduced when measuring the position of the reflective module 300.

Figure 10:
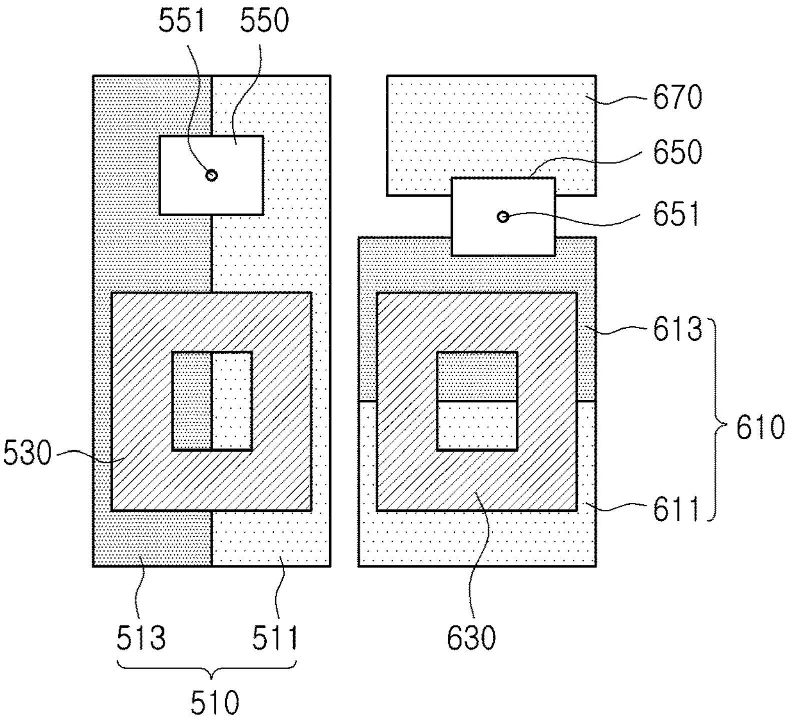
FIG. 10 is a diagram illustrating a first driver and a second driver according to a fourth embodiment.
Figure 11:
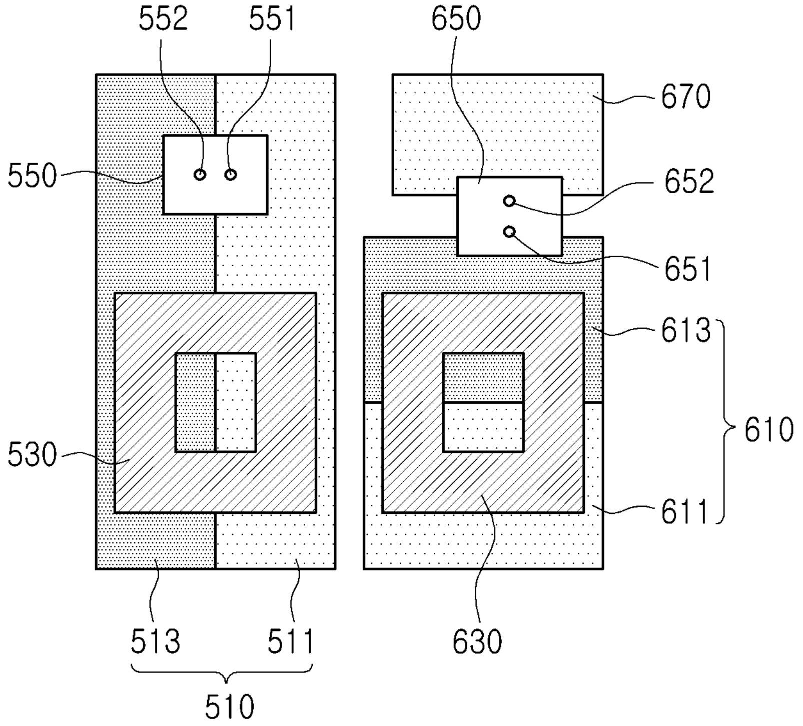
FIG. 11 is a diagram illustrating a first driver and a second driver according to a fifth embodiment.

FIG. 10 is a diagram illustrating a first driver and a second driver according to a fourth embodiment. FIG. 11 is a diagram illustrating a first driver and a second driver according to a fifth embodiment.

Referring to FIGS. 10 and 11, a first driver 500 may include a first magnet 510 and a first coil 530, and a second driver 600 may include a second magnet 610 and a second coil 630. When viewed in the second axis (Y-axis) direction, FIG. 10 illustrates the example in which the first magnet 510 and the first coil 530 overlap each other, and the second magnet 610 and the second coil 630 overlap each other.

Each of the first magnet 510 and the second magnet 610 may include one magnet. Both the first magnet 510 and the second magnet 610 may be disposed on the first sidewall 331 of the reflective module 300. As another embodiment, the first magnet 510 may be disposed on the first sidewall 331 of the reflective module 300 and the second magnet 610 may be disposed on the second sidewall 332 of the reflective module 300.

The first coil 530 may be disposed to oppose the first magnet 510 in the second axis (Y-axis) direction, and the second coil 630 may be disposed to oppose the second magnet 610 in the second axis (Y-axis) direction.

One side of the first magnet 510 opposing the first coil 530 may have a first polarity 511 and a second polarity 513 magnetized along the optical axis (Z-axis) direction.

For example, one side of the first magnet 510 may have the first polarity 511 and the second polarity 513 in order in the optical axis (Z-axis) direction. The first polarity 511 may be an N pole or an S pole, and the second polarity 513 may have a polarity opposite to that of the first polarity 511. A neutral region may be formed between the first polarity 511 and the second polarity 513.

The first coil 530 may be disposed to oppose the first polarity 511 and the second polarity 513.

The first magnet 510 and the first coil 530 may generate driving force in a direction perpendicular to the directions opposing each other. For example, the first magnet 510 and the first coil 530 may generate driving force in the optical axis (Z-axis) direction.

Accordingly, by the driving force of the first magnet 510 and the first coil 530, the reflective module 300 may rotate with the first axis (X-axis) as a rotational axis.

On one side of the second magnet 610 opposing the second coil 630, the first polarity 611 and the second polarity 613 may be magnetized along a direction perpendicular to the optical axis (Z-axis) direction.

For example, one side of the second magnet 610 may have the first polarity 611 and the second polarity 613 in order in the first axis (X-axis) direction. The first polarity 611 may be an N pole or an S pole, and the second polarity 613 may have a polarity opposite to that of the first polarity 611. A neutral region may be formed between the first polarity 611 and the second polarity 613.

The second coil 630 may be disposed to oppose the first polarity 611 and the second polarity 613.

The second magnet 610 and the second coil 630 may generate driving force in a direction perpendicular to the directions opposing each other. For example, the second magnet 610 and the second coil 630 may generate driving force in the first axis (X-axis) direction.

Accordingly, by the driving force of the second magnet 610 and the second coil 630, the reflective module 300 and the guide member 200 may rotate with the second axis (Y-axis) as a rotational axis.

The first driver 500 and the second driver 600 may generate driving forces in directions perpendicular to each other.

The length of the first magnet 510 in the first axis (X-axis) direction may be longer than the length of the second magnet 610 in the first axis (X-axis) direction.

The first driver 500 may further include a first position sensor 550, and the second driver 600 may further include a second position sensor 650.

When the reflective module 300 rotates with respect to the first axis (X-axis), the position of the reflective module 300 may be sensed by the first position sensor 550.

When the reflective module 300 rotates with respect to the second axis (Y-axis), the position of the reflective module 300 may be sensed by the second position sensor 650.

The first position sensor 550 may be disposed to oppose the first magnet 510. For example, the first position sensor 550 may oppose the first magnet 510 in the second axis (Y-axis) direction.

The second driver 600 may further include a sensing magnet 670. The sensing magnet 670 may be disposed on the first sidewall 331 of the holder 330 and may be spaced apart from the second magnet 610 in the first axis (X-axis) direction.

The second position sensor 650 may be disposed to oppose the second magnet 610 and the sensing magnet 670. For example, the second position sensor 650 may be disposed to oppose the second magnet 610 and the sensing magnet 670 in the second axis (Y-axis) direction.

Each of the first position sensor 550 and the second position sensor 650 may include one or more hall sensors.

When the first position sensor 550 includes a plurality of hall sensors (e.g., two hall sensors 551 and 552), the plurality of hall sensors may be spaced apart from each other in the optical axis (Z-axis) direction. One of the hall sensors 551 may oppose the first polarity 511 of the first magnet 510, and the other hall sensor 552 may oppose the second polarity 513 of the first magnet 510 (see FIG. 11).

When the second position sensor 650 includes a plurality of hall sensors (e.g., two hall sensors 651 and 652), the plurality of hall sensors may be spaced apart from each other in the first axis (X-axis) direction. One of the hall sensors 651 may be disposed close to the second magnet 610, and the other hall sensor 652 may be disposed close to the sensing magnet 670 (see FIG. 11).

When the reflective module 300 rotates with respect to the first axis (X-axis) by the first driver 500, the distance between the first magnet 510 and the first position sensor 550 in the second axis (Y-axis) direction may also change.

Accordingly, the position of the reflective module 300 may be accurately measured through the change in magnetic flux of the first magnet 510 sensed by the first position sensor 550. Also, when the first position sensor 550 includes a plurality of hall sensors, the influence of disturbances such as temperature change may be reduced when measuring the position of the reflective module 300.

When the reflective module 300 rotates about the second axis (Y-axis) by the second driver 600, the second position sensor 650 may move closer to one of the sensing magnet 670 and the second magnet 610 and may be spaced farther apart from the other.

Accordingly, the position of the reflective module 300 may be precisely measured through the magnetic flux change of the sensing magnet 670 and the magnetic flux change of the second magnet 610 sensed by the second position sensor 650, respectively. Also, when the second position sensor 650 includes a plurality of hall sensors, the influence of disturbances such as temperature change may be reduced when measuring the position of the reflective module 300.

Figure 12:
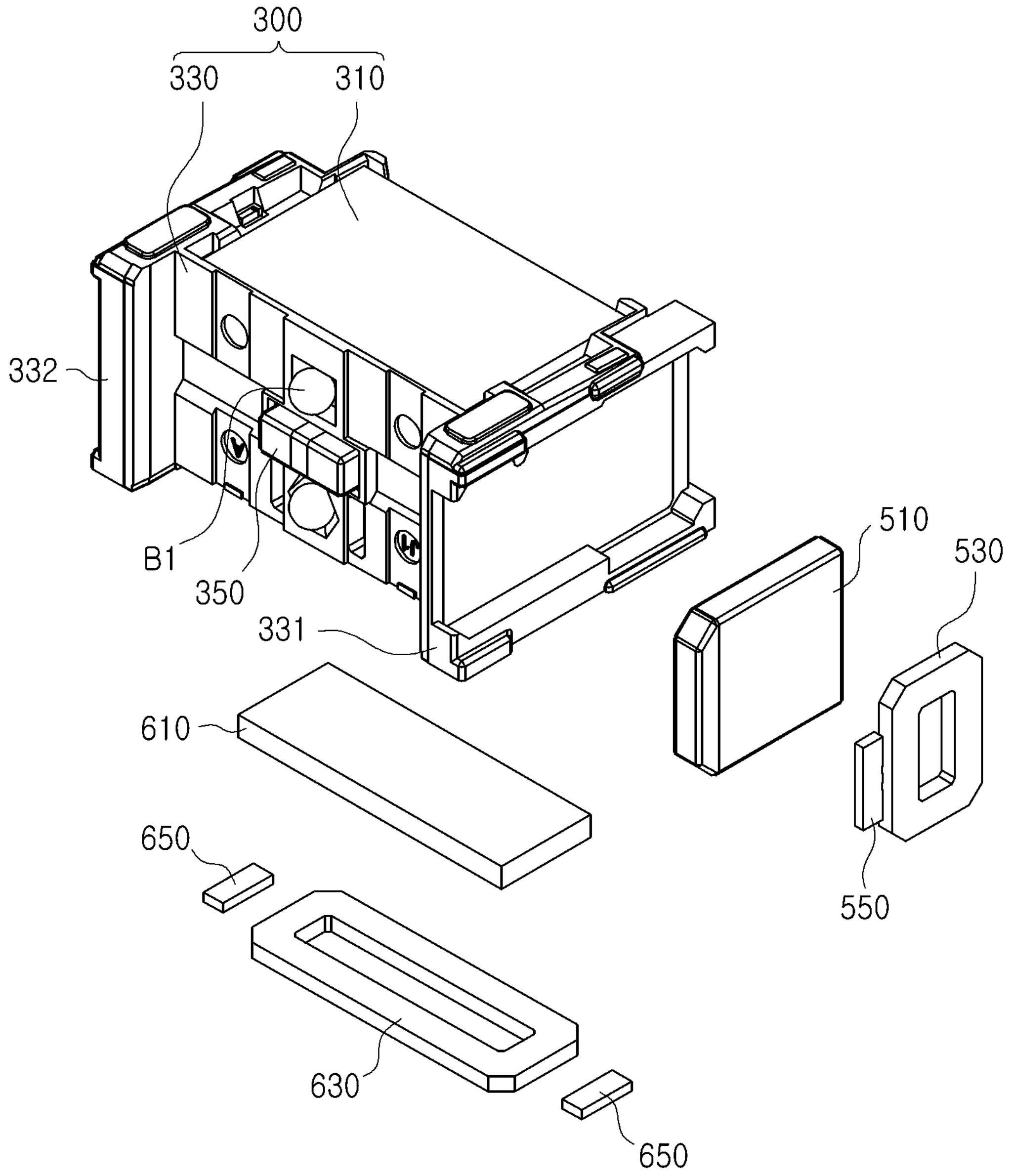
FIG. 12 is a perspective diagram illustrating a reflective module, a first driver and a second driver according to a fifth embodiment.
Figure 13A:
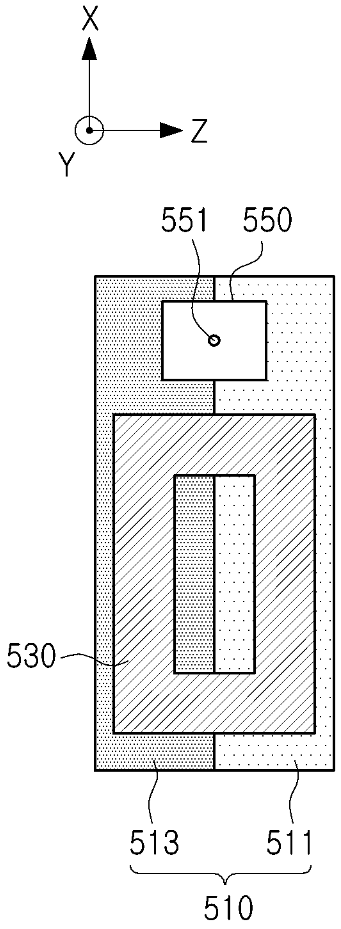
FIGS. 13A and 13B are diagrams illustrating a first driver and a second driver according to another embodiment.
Figure 13B:
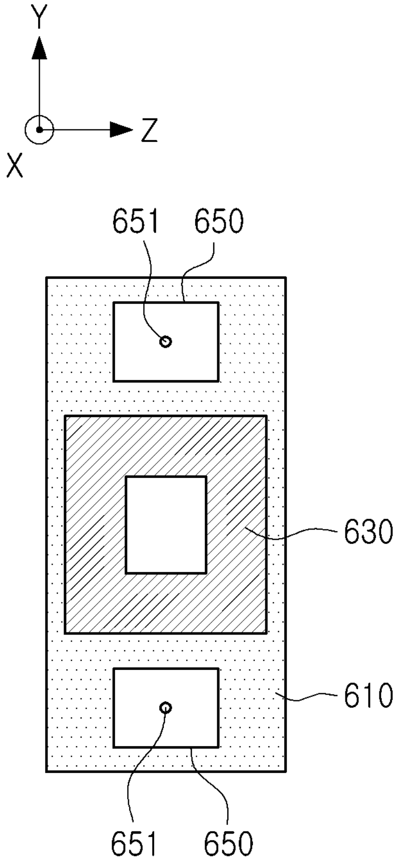

FIG. 12 is a perspective diagram illustrating a reflective module, a first driver and a second driver according to a fifth embodiment. FIGS. 13A and 13B are diagrams illustrating a first driver and a second driver according to another embodiment.

Referring to FIG. 12, a first magnet may be disposed on one sidewall of a reflective module, and a second magnet may be disposed on a lower surface of the reflective module.

For example, a first magnet may be disposed on a first sidewall of a reflective module, and a second magnet may be disposed on a lower surface of the reflective module.

Referring to FIGS. 13A and 13B, a first driver 500 may include a first magnet 510 and a first coil 530, and a second driver 600 may include a second magnet 610 and a second coil 630.

In FIG. 13A, the first magnet 510 and the first coil 530 may overlap when viewed in the direction of the second axis (Y-axis), and in FIG. 13B, the second magnet 610 and the second coil 630 may overlap each other when viewed in the first axis (X-axis) direction.

The first magnet 510 and the second magnet 610 may each include a magnet.

The first coil 530 may be disposed to oppose the first magnet 510 in the second axis (Y-axis) direction, and the second coil 630 may be disposed to oppose the second magnet 610 in the first axis (X-axis) direction.

One side of the first magnet 510 opposing the first coil 530 may have a first polarity 511 and a second polarity 513 magnetized in the optical axis (Z-axis) direction.

For example, one side of the first magnet 510 may have a first polarity 511 and a second polarity 513 in order in the optical axis (Z-axis) direction. The first polarity 511 may be an N pole or an S pole, and the second polarity 513 may have a polarity opposite to that of the first polarity 511. A neutral region may be formed between the first polarity 511 and the second polarity 513.

The first coil 530 may be disposed to oppose the first polarity 511 and the second polarity 513.

The first magnet 510 and the first coil 530 may generate driving force in a direction perpendicular to the directions opposing each other. For example, the first magnet 510 and the first coil 530 may generate driving force in the optical axis (Z-axis) direction.

Accordingly, by the driving force of the first magnet 510 and the first coil 530, the reflective module 300 may rotate with the first axis (X-axis) as a rotational axis.

One side of the second magnet 610 opposing the second coil 630 may have the first polarity 611 or the second polarity 613.

The second magnet 610 and the second coil 630 may generate driving force in opposite directions in the directions opposing each other. For example, the second magnet 610 and the second coil 630 may generate driving force in the first axis (X-axis) direction.

Accordingly, by the driving force of the second magnet 610 and the second coil 630, the reflective module 300 and the guide member 200 may rotate with the second axis (Y-axis) as a rotational axis.

The first driver 500 and the second driver 600 may generate driving forces in directions perpendicular to each other.

The first driver 500 may further include a first position sensor 550, and the second driver 600 may further include a second position sensor 650.

When the reflective module 300 rotates with respect to the first axis (X-axis), the position of the reflective module 300 may be sensed by the first position sensor 550.

When the reflective module 300 rotates with respect to the second axis (Y-axis), the position of the reflective module 300 may be sensed by the second position sensor 650.

The first position sensor 550 may be disposed to oppose the first magnet 510. For example, the first position sensor 550 may oppose the first magnet 510 in the second axis (Y-axis) direction.

The first position sensor 550 may include one or more hall sensors.

When the reflective module 300 rotates with respect to the first axis (X-axis) by the first driver 500, the distance between the first magnet 510 and the first position sensor 550 in the second axis (Y-axis) direction may also change.

Accordingly, the position of the reflective module 300 may be accurately measured through the change in magnetic flux of the first magnet 510 sensed by the first position sensor 550. Also, when the first position sensor 550 includes a plurality of hall sensors, the influence of disturbances such as temperature change may be reduced when measuring the position of the reflective module 300.

The second position sensor 650 may be disposed to oppose the second magnet 610. For example, the second position sensor 650 may be disposed to oppose the second magnet 610 in the first axis (X-axis) direction.

A plurality of the second position sensors 650 may be provided, and each second position sensor 650 may include one or more hall sensors. For example, when two second position sensors 650 are provided, the two second position sensors 650 may be spaced apart from each other in the second axis (Y-axis) direction. A second coil 630 may be disposed between the two second position sensors 650.

When the reflective module 300 rotates with respect to the second axis (Y-axis) by the second driver 600, the distance between the second position sensor 650 and the second magnet 610 in the first axis (X-axis) direction may also change.

Accordingly, the position of the reflective module 300 may be accurately measured through the change in magnetic flux of the second magnet 610 sensed by the second position sensor 650. Also, since two second position sensors 650 are provided, the influence of disturbances such as temperature changes may be reduced when measuring the position of the reflective module 300.

Figure 14:
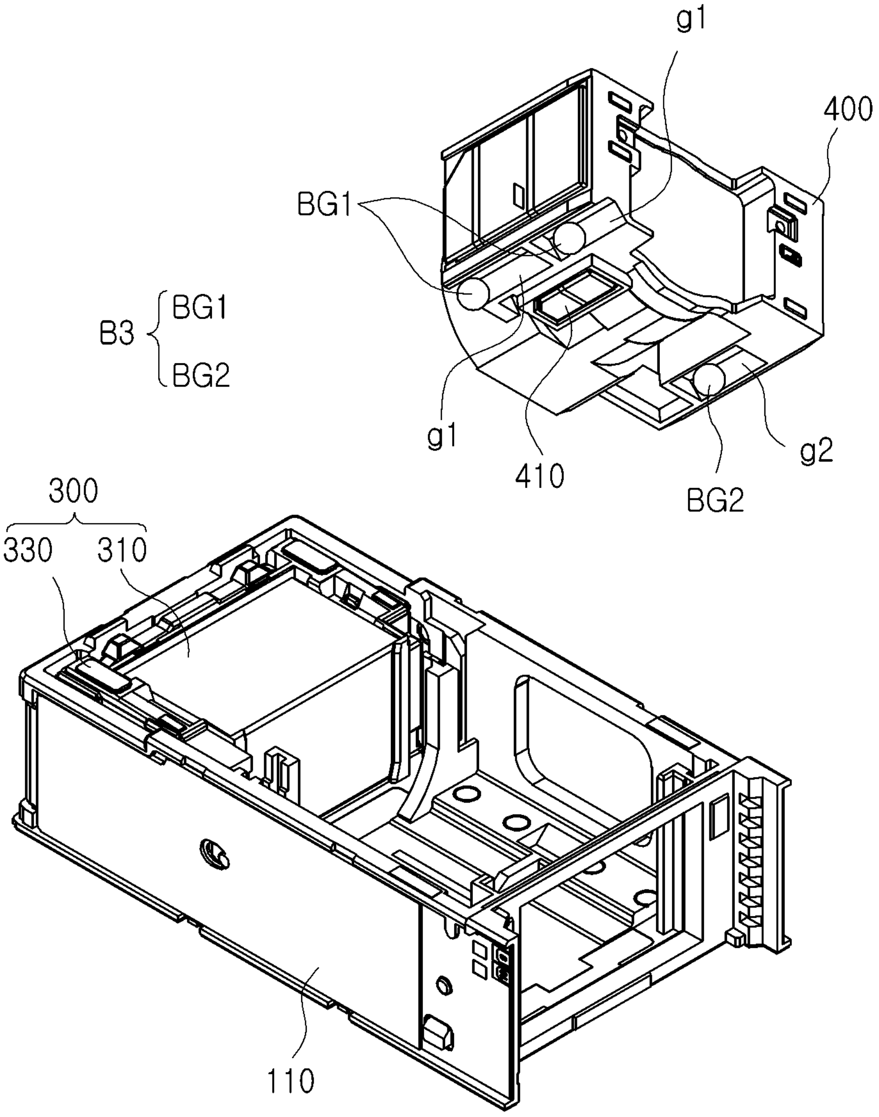
FIG. 14 is a perspective diagram illustrating a state in which a lens module is separated from a camera module according to an embodiment of the present disclosure.

FIG. 14 is a perspective diagram illustrating a state in which a lens module is separated from a camera module according to an embodiment.

Referring to FIG. 14, a reflective module 300 and a lens module 400 may be disposed in an internal space of a housing 110. A lens module 400 may be disposed on the rear side of the reflective module 300.

The lens module 400 may move in the optical axis (Z-axis) direction for focus adjustment.

A third driver 700 may be provided to move the lens module 400 in the optical axis (Z-axis) direction (see FIG. 3).

The third driver 700 may include a third magnet 710 and a third coil 730.

The third magnet 710 may be mounted on the lens module 400. For example, the third magnet 710 may be disposed on the side surface of the lens module 400.

The third coil 730 may be disposed to oppose the third magnet 710 in a direction perpendicular to the optical axis (Z-axis) direction. For example, the housing 110 may include a through-hole in which the third coil 730 is disposed, and the third coil 730 may be disposed in the through-hole and may oppose the third magnet 710 in the second axis (Y-axis) direction. A third coil 730 may be disposed on the substrate 800 coupled to the housing 110.

The third magnet 710 may include a plurality of magnets disposed on both side surfaces of the lens module 400, and the third coil 730 may also include a plurality of coils corresponding to the third magnet 710.

The third magnet 710 and the third coil 730 may generate driving force in a direction perpendicular to the directions opposing each other. For example, the third magnet 710 and the third coil 730 may generate driving force in the optical axis (Z-axis) direction.

Accordingly, the lens module 400 may move in the optical axis (Z-axis) direction by the driving force of the third magnet 710 and the third coil 730.

A third ball member B3 may be disposed between the lens module 400 and the housing 110, and the lens module 400 may move in the optical axis (Z-axis) direction guided by the third ball member B3.

The third ball member B3 may include a first ball group BG1 and a second ball group BG2. The first ball group BG1 and the second ball group BG2 may be spaced apart from each other in a direction perpendicular to the optical axis (Z-axis). For example, the first ball group BG1 and the second ball group BG2 may be spaced apart from each other in the second axis (Y-axis) direction.

The first ball group BG1 may include two or more balls disposed in a direction parallel to the optical axis (Z-axis), and the second ball group BG2 may include a smaller number of balls than the number of balls included in the first ball group BG1.

The number of balls belonging to each ball group may change on the premise that the number of balls belonging to the first ball group BG1 and the number of balls belonging to the second ball group BG2 are different. Hereinafter, for ease of description, the embodiment in which the first ball group BG1 includes two balls and the second ball group BG2 includes one ball will be described.

A pulling magnet 410 may be disposed on a lower surface of the lens module, and a yoke member may be disposed on an inner bottom surface of the housing 110. The yoke member may be disposed in a position opposing the pulling magnet 410 in the first axis (X-axis) direction.

The pulling magnet 410 and the yoke member may generate an attractive force therebetween. For example, an attractive force may act in the first axis (X-axis) direction between the pulling magnet 410 and the yoke member.

The third ball member B3 may be in contact with each of the lens module 400 and the housing 110 due to the attractive force of the pulling magnet 410 and the yoke member.

Guide grooves may be disposed on surfaces on which the lens module 400 and the housing 110 oppose each other. For example, the first guide groove g1 may be disposed on one side of the surface on which the lens module 400 and the housing 110 oppose each other, and the second guide groove g2 may be disposed on the other side of the surface on which the lens module 400 and the housing 110 oppose each other.

The first guide groove g1 and the second guide groove g2 may be spaced apart from each other in a direction perpendicular to the optical axis (Z-axis) (e.g., the second axis (Y-axis) direction).

The first guide groove g1 and the second guide groove g2 may extend in a direction parallel to the optical axis (Z-axis).

The first ball group BG1 may be disposed in the first guide groove g1, and the second ball group BG2 may be disposed in the second guide groove g2.

The number of contact points at which the plurality of balls included in the first ball group BG1 are in contact with the first guide groove g1 may be greater than the number of contact points at which one or more balls included in the second ball group BG2 are in contact with the second guide groove g2.

The first ball group BG1 and the first guide groove g1 may function as a main guide for guiding movement of the lens module 400 in the optical axis (Z-axis) direction.

The second ball group BG2 and the second guide groove g2 may function as an auxiliary guide supporting movement of the lens module 400 in the optical axis (Z-axis) direction.

Referring to FIG. 14, the pulling magnet 410 may be disposed closer to the first ball group BG1 than to the second ball group BG2.

That is, the pulling magnet 410 may be disposed closer to the main guide than to the auxiliary guide.

A third position sensor 750 may be provided to the camera module 1000 in an embodiment to sense the position of the lens module 400.

The third position sensor 750 may be configured as a hall sensor.

The third position sensor 750 may be disposed to oppose the third magnet 710.

According to the aforementioned embodiments, the reflective module and the camera module including the same may precisely sense the position of the reflective module.

While specific examples have been shown and described above, it will be apparent after an understanding of this disclosure that various changes in form and details may be made in these examples without departing from the spirit and scope of the claims and their equivalents.

The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A reflective module comprising:

a reflective member configured to change a path of light;

a holder on which the reflective member is mounted;

a housing in which the holder is disposed;

a first driver comprising one first magnet mounted on the holder, a first coil opposing the one first magnet, and a first position sensor; and a second driver comprising one second magnet mounted on the holder, a second coil opposing the one second magnet, and a second position sensor, wherein the holder comprises a first sidewall and a second sidewall, one side of the one first magnet has at least a first polarity and a second polarity sequentially arranged in an optical axis direction, one side of the one second magnet has at least a first polarity and a second polarity sequentially arranged in a first axis direction perpendicular to the optical axis direction, the first sidewall is spaced apart from the second sidewall in a second axis direction perpendicular to both the optical axis direction and the first axis direction, both the one first magnet and the one second magnet are disposed only on the first sidewall, and all remaining surfaces of the holder are free of any magnet.

2. The reflective module of claim 1, wherein in a state in which the one first magnet and the one second magnet are mounted on the holder, a center of gravity of the holder is closer to the first sidewall of the holder than to the second sidewall of the holder.

3. The reflective module of claim 1, further comprising a sensing magnet mounted on the holder, wherein the first position sensor comprises one or more Hall sensors, and the second position sensor comprises a plurality of Hall sensors, and the optical axis direction and the first axis direction are perpendicular to a direction in which the one first magnet and the first coil oppose each other.

4. The reflective module of claim 3, wherein a size of a portion of the one second magnet having the first polarity is different from a size of a portion of the one second magnet having the second polarity, the first position sensor opposes a portion of the one second magnet having a larger size among the portion of the one second magnet having the first polarity and the portion of the one second magnet having the second polarity, and the second position sensor opposes the sensing magnet and the one first magnet.

5. The reflective module of claim 3, wherein the first position sensor opposes the one first magnet, and the second position sensor opposes the sensing magnet and the one second magnet.

6. The reflective module of claim 3, wherein the first position sensor comprises a plurality of Hall sensors, and the plurality of Hall sensors of the first position sensor are spaced apart from each other in the optical axis direction.

7. The reflective module of claim 3, wherein the plurality of Hall sensors of the second position sensor are spaced apart from each other in the first axis direction.

8. The reflective module of claim 3, wherein a length of the one first magnet in the first axis direction is different from a length of the one second magnet in the first axis direction.

9. The reflective module of claim 1, further comprising a sensing magnet mounted on the holder, wherein the first position sensor comprises one or more Hall sensors, and the second position sensor comprises a plurality of Hall sensors, the one side of the one first magnet has the first polarity, the second polarity, and a first polarity sequentially arranged in the optical axis direction, and the optical axis direction and the first axis direction are perpendicular to a direction in which the one first magnet and the first coil oppose each other.

10. The reflective module of claim 9, wherein a size of a first portion of the one first magnet having the first polarity is different from a size of a second portion of the one first magnet having the first polarity, the first position sensor opposes a portion of the one first magnet having the second polarity, and a portion of the one first magnet having a smaller size among the first portion of the one first magnet having the first polarity and the second portion of the one first magnet having the first polarity, and the second position sensor opposes the sensing magnet and the one second magnet.

11. The reflective module of claim 10, wherein the first position sensor comprises a plurality of Hall sensors, and the plurality of Hall sensors of the first position sensor are spaced apart from each other in the optical axis direction, and the plurality of Hall sensors of the second position sensor are spaced apart from each other in the first axis direction.

12. The reflective module of claim 1, further comprising a sensing magnet mounted on the holder, wherein the first position sensor comprises one or more Hall sensors, and the second position sensor comprises a plurality of Hall sensors, the one side of the one second magnet has the first polarity, the second polarity, and a first polarity sequentially arranged in the first axis direction, and the optical axis direction and the first axis direction are perpendicular to a direction in which the one first magnet and the first coil oppose each other.

13. The reflective module of claim 12, wherein a size of a first portion of the one second magnet having the first polarity is different from a size of a second portion of the one second magnet having the first polarity, the second position sensor opposes a portion of the one second magnet having the second polarity, and a portion of the one second magnet having a smaller size among the first portion of the one second magnet having the first polarity and the second portion of the one second magnet having the first polarity, and the first position sensor opposes the sensing magnet.

14. A portable electronic device comprising the reflective module of claim 1.

15. A camera module comprising:

a lens module comprising a plurality of lenses disposed along an optical axis;

a housing in which the lens module is disposed;

a reflective module disposed on a front side of the lens module along the optical axis and comprising a reflective member configured to change a path of light, and a holder on which the reflective member is mounted;

a first driver comprising one first magnet mounted on the holder, a first coil opposing the one first magnet, and a first position sensor; and a second driver comprising one second magnet mounted on the holder, a second coil opposing the one second magnet, and a second position sensor, wherein the reflective module is configured to rotate about a first axis and a second axis both perpendicular to the optical axis and perpendicular to each other as rotational axes, the holder comprises a first sidewall and a second sidewall, one side of the one first magnet has at least a first polarity and a second polarity sequentially arranged in an optical axis direction, one side of the one second magnet has at least a first polarity and a second polarity sequentially arranged in a first axis direction perpendicular to the optical axis direction, the first sidewall is spaced apart from the second sidewall in a second axis direction perpendicular to both the optical axis direction and the first axis direction, both the one first magnet and the one second magnet are disposed only on one of the first sidewall and the second sidewall, and all remaining surfaces of the holder are free of any magnet.

16. The camera module of claim 15, further comprising a sensing magnet mounted on the holder, wherein the first position sensor is configured to sense a change in a position of the reflective module rotating about the first axis as a rotational axis, and comprises one or more Hall sensors, the second position sensor is configured to sense a change in a position of the reflective module rotating about the second axis as a rotational axis, and comprises a plurality of Hall sensors, and the plurality of Hall sensors of the second position sensor are spaced apart from each other along the first axis.

17. A portable electronic device comprising the camera module of claim 15.

18. A reflective module comprising:

a reflective member configured to change a path of light; and a holder on which the reflective member is mounted, the holder comprising a first sidewall, and a second sidewall parallel to the first sidewall and spaced apart from the first sidewall in a direction perpendicular to the first sidewall and the second sidewall, wherein a first driving magnet configured to drive the holder in an optical axis direction is disposed on the first sidewall, and the second sidewall is free of any driving magnet configured to drive the holder in the optical axis direction, a second driving magnet configured to drive the holder in a first direction perpendicular to the optical axis direction is disposed on the first sidewall, and the second sidewall is free of any driving magnet configured to drive the holder in the first direction, and a first driving coil is disposed opposing the first driving magnet in a second direction perpendicular to the optical axis direction and the first direction, a second driving coil is disposed opposing the second driving magnet in the second direction, and all remaining surfaces of the holder are free of any magnet.

19. A portable electronic device comprising:

a camera module comprising:

a lens module comprising a plurality of lenses disposed in the optical axis direction, a housing in which the lens module is disposed, and the reflective module of claim 18 disposed on a front side of the lens module in the optical axis direction.

* * * * *